(12) United States Patent
Osman

(10) Patent No.: US 10,127,728 B2
(45) Date of Patent: Nov. 13, 2018

(54) FACIAL FEATURE VIEWS OF USER VIEWING INTO VIRTUAL REALITY SCENES AND INTEGRATION OF FACIAL FEATURES INTO VIRTUAL REALITY VIEWS INTO SCENES

(71) Applicant: Sony Interactive Entertainment Inc., Tokyo (JP)

(72) Inventor: Steven Osman, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 15/421,334

(22) Filed: Jan. 31, 2017

(65) Prior Publication Data
US 2018/0096533 A1 Apr. 5, 2018

Related U.S. Application Data

(60) Provisional application No. 62/402,437, filed on Sep. 30, 2016.

(51) Int. Cl.
*G06T 19/00* (2011.01)
*G06K 9/00* (2006.01)
(Continued)

(52) U.S. Cl.
CPC ............ *G06T 19/006* (2013.01); *A63F 13/25* (2014.09); *A63F 13/525* (2014.09); *G06F 3/012* (2013.01);
(Continued)

(58) Field of Classification Search
None
See application file for complete search history.

(56) References Cited

U.S. PATENT DOCUMENTS 8,184,067 B1   5/2012  Braun et al. .................. 345/639
2012/0154277 A1   6/2012  Bar-Zeev et al. ............. 345/158
(Continued)

FOREIGN PATENT DOCUMENTS

WO    WO 2012/011893 A1    1/2012    ............ G06F 3/038

OTHER PUBLICATIONS

Yao, R., Heath, T., Davies, A., Forsyth, T., Mitchell, N., & Hoberman, P. (2014). Oculus vr best practices guide. Oculus VR, 27-39.*
(Continued)

*Primary Examiner* — Ryan M Gray
(74) *Attorney, Agent, or Firm* — Martine Penilla Group, LLP

(57) ABSTRACT

A method, system, computer readable media and cloud systems are provided for rendering virtual reality (VR) views into VR scenes for presentation to a head mounted display (HMD). One method includes sensing a position of a nose of the user when the HMD is worn by the user. The method includes identifying a model of the nose of the user based on the position that is sensed. The model of the nose having a dimension that is based on the position of the nose of the user, when the HMD is worn. The method further includes rendering images to a screen of the HMD to present the VR scenes. The images being augmented to include nose image data from the model of the nose. In one example, the HMD is configured to capture facial feature expressions which are usable to generate avatar faces of the user, and convey facial expressions and/or emotion.

22 Claims, 15 Drawing Sheets

(51) Int. Cl.
  *G06F 3/01* (2006.01)
  *G06T 17/10* (2006.01)
  *G06T 15/60* (2006.01)
  *G06T 13/40* (2011.01)
  *A63F 13/25* (2014.01)
  *A63F 13/525* (2014.01)
(52) U.S. Cl.
  CPC ......... *G06F 3/013* (2013.01); *G06K 9/00268* (2013.01); *G06T 13/40* (2013.01); *G06T 15/60* (2013.01); *G06T 17/10* (2013.01); *A63F 2300/8082* (2013.01)

(56) References Cited

U.S. PATENT DOCUMENTS

| | | | | |
|---|---|---|---|---|
| 2014/0204191 | A1* | 7/2014 | Takai | G02B 27/017 348/77 |
| 2015/0085372 | A1* | 3/2015 | Yoshida | G02B 27/0172 359/633 |
| 2015/0277123 | A1* | 10/2015 | Chaum | G02B 27/0093 348/62 |
| 2016/0086378 | A1* | 3/2016 | Shuster | G06F 3/013 345/633 |
| 2016/0300391 | A1* | 10/2016 | Whittinghill | A63F 13/803 |
| 2017/0345212 | A1* | 11/2017 | Palmieri | G06T 19/006 |
| 2017/0352183 | A1* | 12/2017 | Katz | G06T 19/006 |

OTHER PUBLICATIONS

Chen, Joshua Yang. "Augmenting immersive cinematic experience/scene with user body visualization." (Feb. 2016).*

Unknown, "*Virtual noses keep real-world VR sickness at bay*", Mar. 25, 2015, XP055421724, URL:https://arstechnica.com/gaming/2015/03/virtual-noses-keep-real-world-vr-sickness-at-bay/.

* cited by examiner

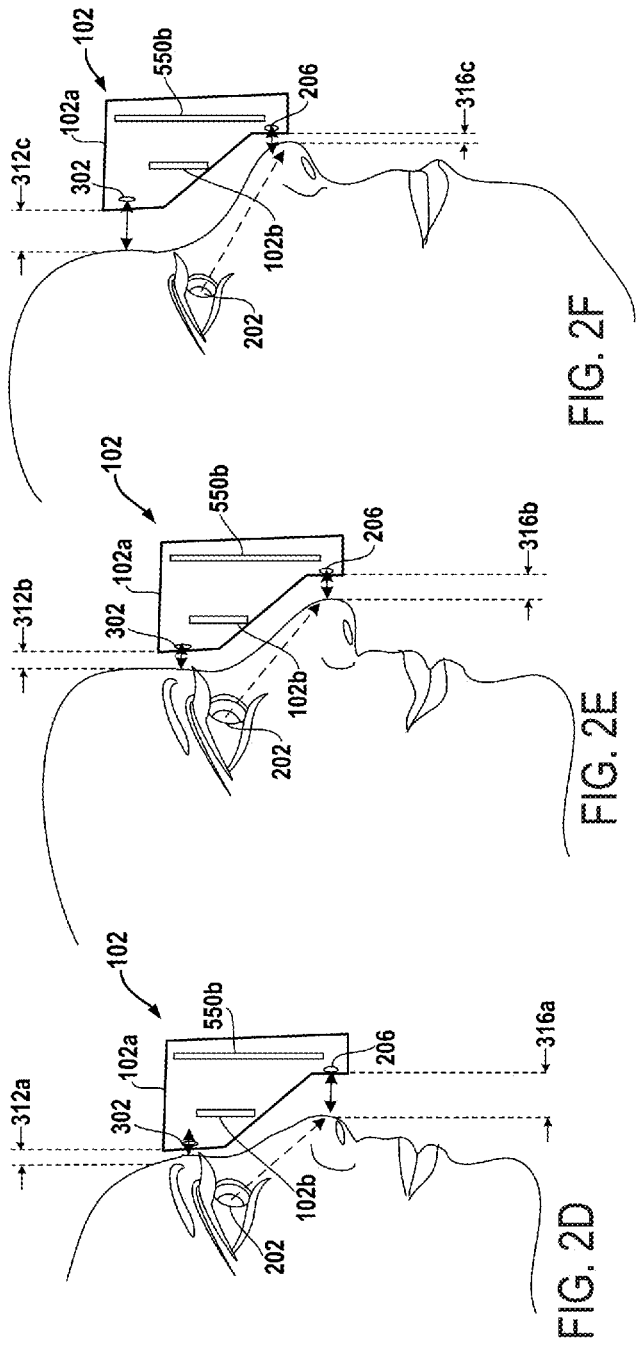
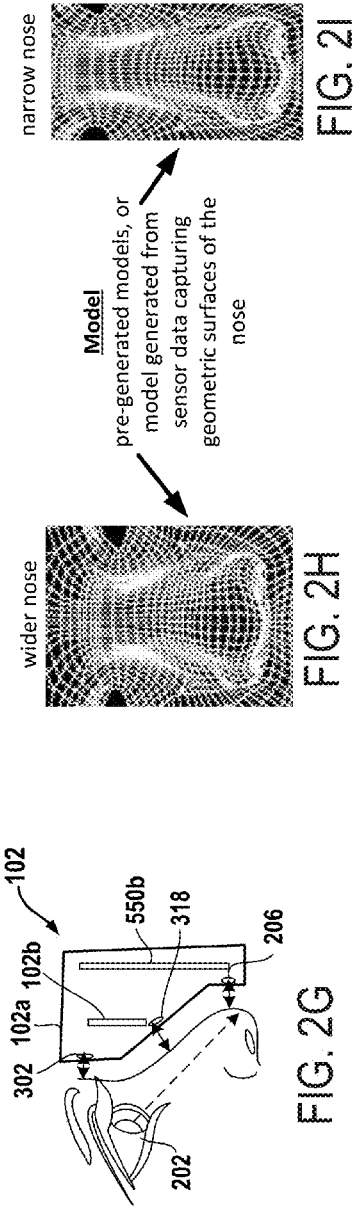

FACIAL FEATURE VIEWS OF USER VIEWING INTO VIRTUAL REALITY SCENES AND INTEGRATION OF FACIAL FEATURES INTO VIRTUAL REALITY VIEWS INTO SCENES

CLAIM OF PRIORITY

The present application claims priority to and the benefit of provisional patent application, U.S. Ser. No. 62/402,437, entitled "Facial Feature Views of User Viewing Into Virtual Reality Scenes and Integration of Facial Features Into Virtual Reality Views Into Scenes" with filing date Sep. 30, 2016, which is herein incorporated by reference in its entirety.

FIELD OF THE DISCLOSURE

The present disclosure relates to generation of virtual reality (VR) content for presentation in head mounted displays (HMDs), and in some embodiments, methods and systems for rendering a user's facial features in views rendered of a VR space, in order to provide HMD users with more realistic perspective into VR spaces.

BACKGROUND

The video game industry has seen many changes over the years. As computing power has expanded, developers of video games have likewise created game software that takes advantage of these increases in computing power. To this end, video game developers have been coding games that incorporate sophisticated operations and mathematics to produce very detailed and engaging gaming experiences.

Example gaming platforms include the Sony Playstation®, Sony Playstation2® (PS2), Sony Playstation3® (PS3), and Sony Playstation4® (PS4), each of which is sold in the form of a game console. As is well known, the game console is designed to connect to a display (typically a television) and enable user interaction through handheld controllers. The game console is designed with specialized processing hardware, including a CPU, a graphics synthesizer for processing intensive graphics operations, a vector unit for performing geometry transformations, and other glue hardware, firmware, and software. The game console may be further designed with an optical disc reader for receiving game discs for local play through the game console. Online gaming is also possible, where a user can interactively play against or with other users over the Internet. As game complexity continues to intrigue players, game and hardware manufacturers have continued to innovate to enable additional interactivity and computer programs.

A growing trend in the computer gaming industry is to develop games that increase the interaction between the user and the gaming system. One way of accomplishing a richer interactive experience is to use wireless game controllers whose movement is tracked by the gaming system in order to track the player's movements and use these movements as inputs for the game. Generally speaking, gesture input refers to having an electronic device such as a computing system, video game console, smart appliance, etc., react to some gesture made by the player and captured by the electronic device.

Another way of accomplishing a more immersive interactive experience is to use a head mounted display. A head mounted display is worn by the user and can be configured to present various graphics, such as a view of a virtual reality (VR) space. The graphics presented on a head-mounted display can cover a large portion or even all of a user's field of view. Hence, a head-mounted display can provide a visually immersive experience to the user.

It is in this context that embodiments of the disclosure arise.

SUMMARY

Implementations of the present disclosure include methods and systems that are used to capture information related to a user space, and in some embodiments integrate certain facial features into images of the HMD content presented in an HMD.

In one embodiment, a method for rendering virtual reality (VR) views into VR scenes for presentation to a head mounted display (HMD) is disclosed. This method includes sensing a position of a nose of the user when the HMD is worn by the user. The method includes identifying a model of the nose of the user based on the position that is sensed. The model of the nose having a dimension that is based on the position of the nose of the user, when the HMD is worn. The method further includes rendering images to a screen of the HMD to present the VR scenes. The images being augmented to include nose image data from the model of the nose. In one example, the HMD is configured to capture facial feature expressions which are usable to generate avatar faces of the user, and convey facial expressions and/or emotion.

In some embodiments, the screen of the HMD is defined by a left screen for a left eye of the user and a right screen for a right eye of the user, the nose image data being rendered near a bottom right region of the left screen and a bottom left region of the right screen.

In some embodiments, the dimension of the model of the nose includes an approximate size of the nose of the user, the dimension of the model of the nose is used to define a degree by which the images are augmented to include the image data of the model of the nose.

In some embodiments, the model of the nose has a three-dimensional shape that is approximated from the position of the nose of the user in a nose insert region of a display housing of the HMD.

In some embodiments, the sensing of the position of the nose is processed by detecting a proximity of the nose from a proximity sensor disposed in a nose insert region of a display housing of the HMD.

In some embodiments, a method further includes sensing that the HMD is being worn by a user. And, in one configuration, sensing that the HMD is being worn by the user is processed by detecting proximity of a forehead of the user from a proximity sensor disposed in a display housing of the HMD.

In some embodiments, a method further includes having a display housing of the HMD with optics for viewing the screen. The optics are configured for placement proximate to eyes of the user. The placement of the optics act to provide a view toward the screen and also act to occlude facial features of the user when wearing the HMD. The method further includes detecting movements of occluded facial features of the user using one or more proximity sensors that are disposed around an inner surface of the display housing that surround the optics.

In some embodiments, a method further includes determining an amount of the movements of the occluded facial features. The method then includes augmenting the images rendered to the screen of the HMD to further include one or more shadows around one or more peripheries of the images.

In some embodiments, a degree of the augmenting of the images to include one or more shadows is based on the amount of the movements detected of the occluded facial features using the one or more proximity sensors that are disposed around the inner surface of the display housing that surround the optics.

In some embodiments, a method further includes detecting a position of at least one nose flap of a display housing of the HMD. The at least one nose flap is disposed adjacent to a nose insert region of the display housing. The nose flap is configured to move in response to the nose of the user being placed at least partially in the nose insert region.

In some embodiments, a method further includes detecting eye gaze of the user using one or more eye gaze sensors disposed in a display housing of the HMD. The method also includes adjusting the augmentation of the image to include more of the nose image data when it is determined that the eye gaze is directed down and toward the nose of the user.

In some embodiments, the adjusting of the augmentation of the image is to include less of the nose image data when it is determined that the eye gaze is directed away from the nose of the user.

In another embodiment, a method for rendering virtual reality (VR) views into VR scenes for presentation to a head mounted display (HMD) is provided. This method may include sensing one or more geometric surfaces of a nose of the user by one or more proximity sensors disposed in or around a nose insert region of a display housing of the HMD. Then, generating a model of the nose of the user using the sensed one more geometric surfaces. The method also includes rendering images to a screen of the HMD to present the VR scenes. The images are augmented to include nose image data from the model of the nose.

In some embodiments, the screen of the HMD is defined by a left screen for a left eye of the user and a right screen for a right eye of the user, the nose image data being rendered near a bottom right region of the left screen and a bottom left region of the right screen, the left and right screens being disposed in the display housing having a left optic in front of the left screen and a right optic in front of the right screen.

In some embodiments, the one or more geometric surfaces include, at least a surface indicative of a length of the nose of the user relative to one or more of the proximity sensors of the display housing. The one or more geometric surfaces may include at least a surface indicative of a position of a nose bridge region of the nose of the user relative to one or more of the proximity sensors of the display housing.

In some embodiments, the method may also include using information regarding the surface indicative of the length of the nose and the surface indicative of the position of the nose bridge region to generate the model of the nose of the user. The model of the nose of the user is generated at least in part using data of one or more standard nose shapes accessed from a database of standard nose shapes.

In some embodiments, the information regarding the surface indicative of the length of the nose and the surface indicative of the position of the nose bridge region is used to identify a best fit to the one or more standard nose shapes from the database, and using said information to generate the model of the nose, the model of the nose being semi-custom for the user.

In some embodiments, the method may also include using information regarding the surface indicative of the length of the nose and the surface indicative of the position of the nose bridge region to generate the model of the nose of the user. The model identifying a three-dimensional shape includes one or more contours of the nose of the user, and the three-dimensional shape is configured with color and lighting to approximate a skin color of the user as detected by a camera or other imaging sensor or sensors.

In one embodiment, the method may also include using one or more proximity sensors. The sensors may include one or more of optical sensors, camera sensors, infrared (IR) sensors, ultrasonic sensors, depth sensors, three-dimensional imaging sensors, point-distance capturing sensors, or combinations of two or more thereof.

In one embodiment, the method may also include detecting a position of at least one nose flap of the display housing of the HMD, the at least one nose flap being disposed adjacent to a nose insert region of the display housing. The nose flap is configured to move in response to the nose of the user being placed at least partially in the nose insert region.

In one embodiment, the method may also include approximating a width of the nose of the user by processing the detected position of the at least one nose flap of the display housing. The width that is approximated is used in generating the model of the nose.

In one embodiment, the method may also include detecting eye gaze of the user using one or more eye gaze sensors disposed in a display housing of the HMD. Then, adjusting the augmentation of the image to include more of the nose image data when it is determined that the eye gaze is directed down and toward the nose of the user.

In one embodiment, the method may include adjusting of the augmentation of the image is to include less of the nose image data when it is determined that the eye gaze is directed away from the nose of the user.

In one embodiment, a method for rendering virtual reality (VR) views into VR scenes for presentation to a head mounted display (HMD) is provided. This method may include capturing an image of the face of a user and sensing one or more surfaces of the face of the user when the HMD is worn. The one or more surfaces including regions around eyes of the user and regions around a mouth of the user. The method may include generating a model of the face of the user using the image of the face of the user. Then, generating an avatar face of the user. The avatar face is configured to resemble the face of the user. The avatar face is configured to move to approximate movements of the face of the user in response to the sensing of the one or more surfaces of the face of the user when the HMD is worn by the user. The method may include sharing images of the avatar face to a display for viewing by a person other than the user wearing the HMD. The images of the avatar face configured to show emotional characteristics of the user when interacting with the VR scenes via the HMD.

In some embodiments, the person other than the user wearing the HMD is a first HMD user and the person other than the user is a second HMD user. The first and second users are configured to communicate with each other in the VR scene and the second HMD user views the avatar face of the first HMD user including facial expressions detected by the sensing of the one or more surfaces of the face of the user.

In some embodiments, an HMD of the second HMD user is further configured to generate an avatar face of the second HMD user. The avatar face of the second HMD user is viewable to the first HMD user in the VR space in accordance with facial expressions detected by sensors of the HMD used by the second HMD user.

In some embodiments, capturing an image of the face of the user includes capturing three-dimensional features in order to generate a skeleton of contours of the face of the user. The skeleton of contours used to generate a model of the face of the user.

In some embodiments, the capturing of the image of the face further includes capturing color that approximates a pigment of the face of the user and any hair of the user, the color that approximates the pigment of the face used to generate the avatar face and the hair of the user used to generate a head for the avatar face of the user.

In some embodiments the method may include tracking movements of the head of the user when the HMD is being worn. The tracking assists in mapping movements of the head of the avatar face.

In some embodiments the method may include sensing a nose of the user via a sensor of a display housing of the HMD. The sensing of the nose used to generate a model of a nose of the user. The model of the nose of the user is usable to augment the avatar face. The model of the nose is configured to approximate geometric characteristics of the nose of the user.

Other aspects and advantages of the disclosure will become apparent from the following detailed description, taken in conjunction with the accompanying drawings, illustrating by way of example the principles of the disclosure.

BRIEF DESCRIPTION OF THE DRAWINGS

The disclosure may be better understood by reference to the following description taken in conjunction with the accompanying drawings in which:

FIGS. 2D-2F illustrates examples of using the display housing and sensors integrated within the display housing in order to measure or identify or characterize features associated with the nose of different users.

FIG. 2G illustrates an example where additional sensors can be placed within the display housing, and directed toward the nose of the user.

FIGS. 2H-2I illustrate examples of a model of a nose of the user.

DETAILED DESCRIPTION

Figure 1A:
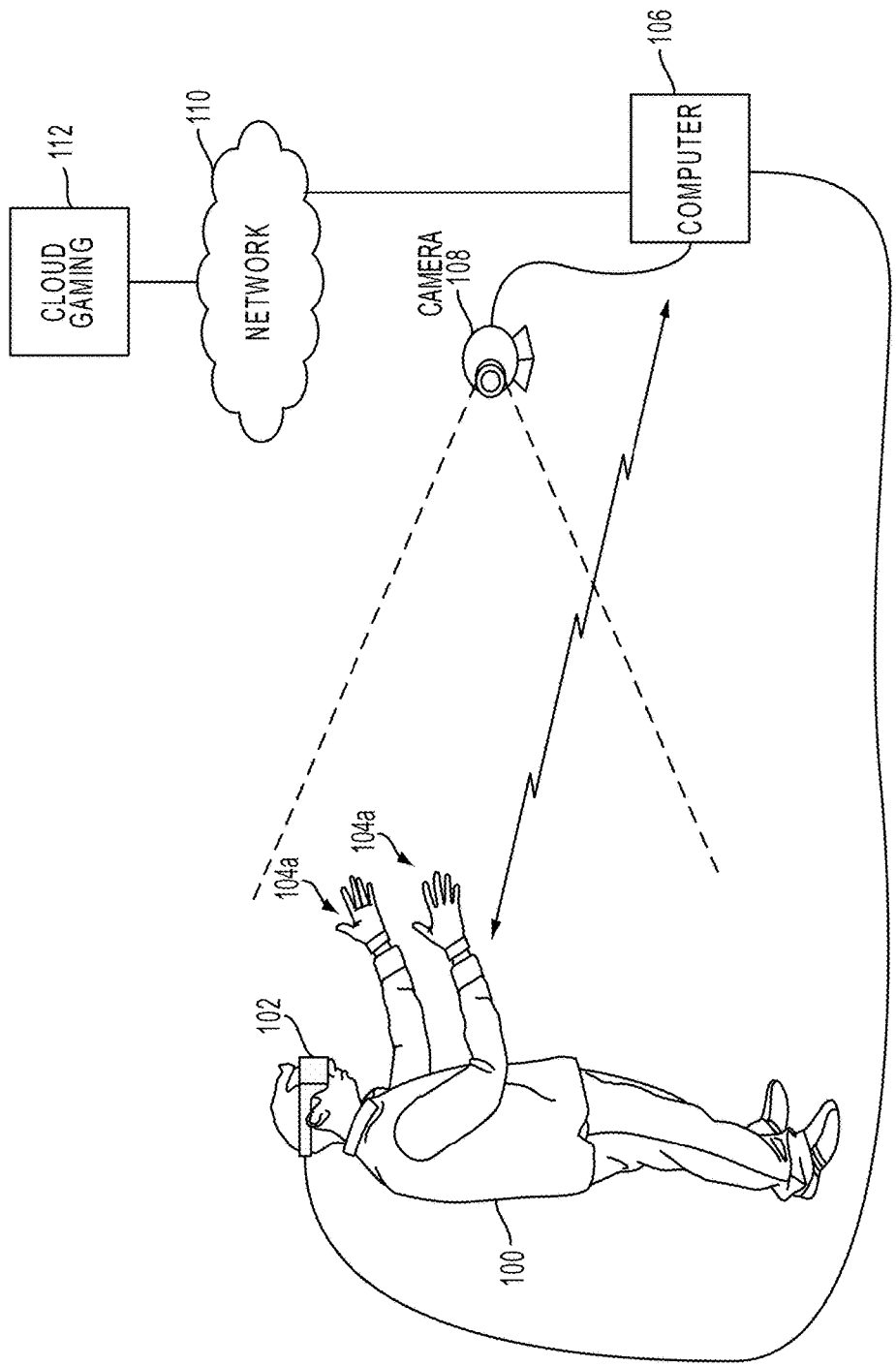
FIG. 1A illustrates a system for interactive gameplay of a video game, in accordance with an embodiment of the disclosure.

The following implementations of the present disclosure provide methods, systems, computer readable media and cloud systems, for rendering virtual reality (VR) views into VR scenes for presentation to a head mounted display (HMD). One method includes sensing a position of a nose of the user when the HMD is worn by the user. The method includes identifying a model of the nose of the user based on the position that is sensed. The model of the nose having a dimension that is based on the position of the nose of the user, when the HMD is worn. The method further includes rendering images to a screen of the HMD to present the VR scenes. The images being augmented to include nose image data from the model of the nose. In one example, the HMD is configured to capture facial feature expressions which are usable to generate avatar faces of the user, and convey facial expressions and/or emotion.

The embodiments described herein therefore enable systems of the HMD to track features of the user space, while wearing the HMD. The features can include identifying characteristics of the user's nose, and using that information to render at least a portion of the user's nose in images presented to the screens of the HMD for viewing the virtual-reality content. By presenting images of the user's nose in the images of the scenes being viewed, the images or partial images of the user's nose will resemble the views that a user typically sees when not wearing an HMD. As such, the user's brain viewing images will be accustomed to seeing at least part of the user's own nose in the scenes, and the user's brain will automatically filter out the presence of the nose.

However, by providing the user's nose or partial views of the user's nose in the scenes, it is possible for the user to feel a more realistic experience when viewing the virtual-reality content. If the user's nose is not provided, at least partially in the images, the user's appearance or perception of the virtual-reality scenes will be less than natural. As such, by providing this integration into the images, in locations where the user is expecting to see at least part of the user's nose, the views into the virtual-reality content will be more natural, and as expected by the user's natural brain reactions to filter out the nose. Embodiments described herein present methods for identifying the nose, characterizing the nose physical characteristics, and then generating models of the nose for presentation at least partially in the scenes.

Additional embodiments described herein relate to methods for tracking facial expressions of the user while wearing the HMD. The facial expressions and also the nose characteristic capturing can be used in conjunction, so as to generate avatar faces. The avatar face of the user can be generated automatically, based on the sensed expressions, image data of the user, and other captured sensor data. In this manner, other people viewing an avatar of the user wearing the HMD, will view a tracked version of the users face, which can show emotion, reactions, likes, dislikes, and other natural characteristics. The following description will provide general aspects associate with an HMD, methods for interacting with an HMD, hardware for processing information related to HMD content, interaction with data sources, and the like.

In one embodiment, the methods, systems, image capture objects, sensors and associated interface objects (e.g., gloves, controllers, hands, etc.) are configured to process data that is configured to be rendered in substantial real time on a display screen. The display may be the display of a head mounted display (HMD), a display of a second screen, a display of a portable device, a computer display, a display panel, a display of one or more remotely connected users (e.g., whom may be viewing content or sharing in an interactive experience), or the like.

It will be obvious, however, to one skilled in the art, that the present disclosure may be practiced without some or all of these specific details. In other instances, well known process operations have not been described in detail in order not to unnecessarily obscure the present disclosure.

FIG. 1A illustrates a system for interactive gameplay of a video game, in accordance with an embodiment of the disclosure. A user 100 is shown wearing a head-mounted display (HMD) 102. The HMD 102 is worn in a manner similar to glasses, goggles, or a helmet, and is configured to display a video game or other content to the user 100. The HMD 102 provides a very immersive experience to the user by virtue of its provision of display mechanisms in close proximity to the user's eyes. Thus, the HMD 102 can provide display regions to each of the user's eyes which occupy large portions or even the entirety of the field of view of the user.

In one embodiment, the HMD 102 can be connected to a computer 106. The connection to computer 106 can be wired or wireless. The computer 106 can be any general or special purpose computer known in the art, including but not limited to, a gaming console, personal computer, laptop, tablet computer, mobile device, cellular phone, tablet, thin client, set-top box, media streaming device, etc. In one embodiment, the computer 106 can be configured to execute a video game, and output the video and audio from the video game for rendering by the HMD 102.

The user 100 may operate a glove interface object 104a to provide input for the video game. Additionally, a camera 108 can be configured to capture images of the interactive environment in which the user 100 is located. These captured images can be analyzed to determine the location and movements of the user 100, the HMD 102, and the glove interface object 104a. In one embodiment, the glove interface object 104a includes a light which can be tracked to determine its location and orientation.

As described below, the way the user interfaces with the virtual reality scene displayed in the HMD 102 can vary, and other interface devices in addition to glove interface objects 104a, can be used. For instance, single-handed controllers can also be used, as well as two-handed controllers. In some embodiments, the controllers can be tracked themselves by tracking lights associated with the controllers, or tracking of shapes, sensors, and inertial data associated with the controllers. Using these various types of controllers, or even simply hand gestures that are made and captured by one or more cameras, it is possible to interface, control, maneuver, interact with, and participate in the virtual reality environment presented on the HMD 102.

Additionally, the HMD 102 may include one or more lights which can be tracked to determine the location and orientation of the HMD 102. The camera 108 can include one or more microphones to capture sound from the interactive environment. Sound captured by a microphone array may be processed to identify the location of a sound source. Sound from an identified location can be selectively utilized or processed to the exclusion of other sounds not from the identified location. Furthermore, the camera 108 can be defined to include multiple image capture devices (e.g. stereoscopic pair of cameras), an IR camera, a depth camera, and combinations thereof.

In another embodiment, the computer 106 functions as a thin client in communication over a network with a cloud gaming provider 112. The cloud gaming provider 112 maintains and executes the video game being played by the user 102. The computer 106 transmits inputs from the HMD 102, the glove interface object 104a and the camera 108, to the cloud gaming provider, which processes the inputs to affect the game state of the executing video game. The output from the executing video game, such as video data, audio data, and haptic feedback data, is transmitted to the computer 106. The computer 106 may further process the data before transmission or may directly transmit the data to the relevant devices. For example, video and audio streams are provided to the HMD 102, whereas a vibration feedback command is provided to the glove interface object 104a.

In one embodiment, the HMD 102, glove interface object 104a, and camera 108, may themselves be networked devices that connect to the network 110 to communicate with the cloud gaming provider 112. For example, the computer 106 may be a local network device, such as a router, that does not otherwise perform video game processing, but which facilitates passage of network traffic. The connections to the network by the HMD 102, glove interface object 104a, and camera 108 may be wired or wireless.

Additionally, though embodiments in the present disclosure may be described with reference to a head-mounted display, it will be appreciated that in other embodiments, non-head mounted displays may be substituted, including without limitation, a television, projector, LCD display screen, portable device screen (e.g. tablet, smartphone, laptop, etc.) or any other type of display that can be configured to render video and/or provide for display of an interactive scene or virtual environment in accordance with the present embodiments.

Figure 1B:
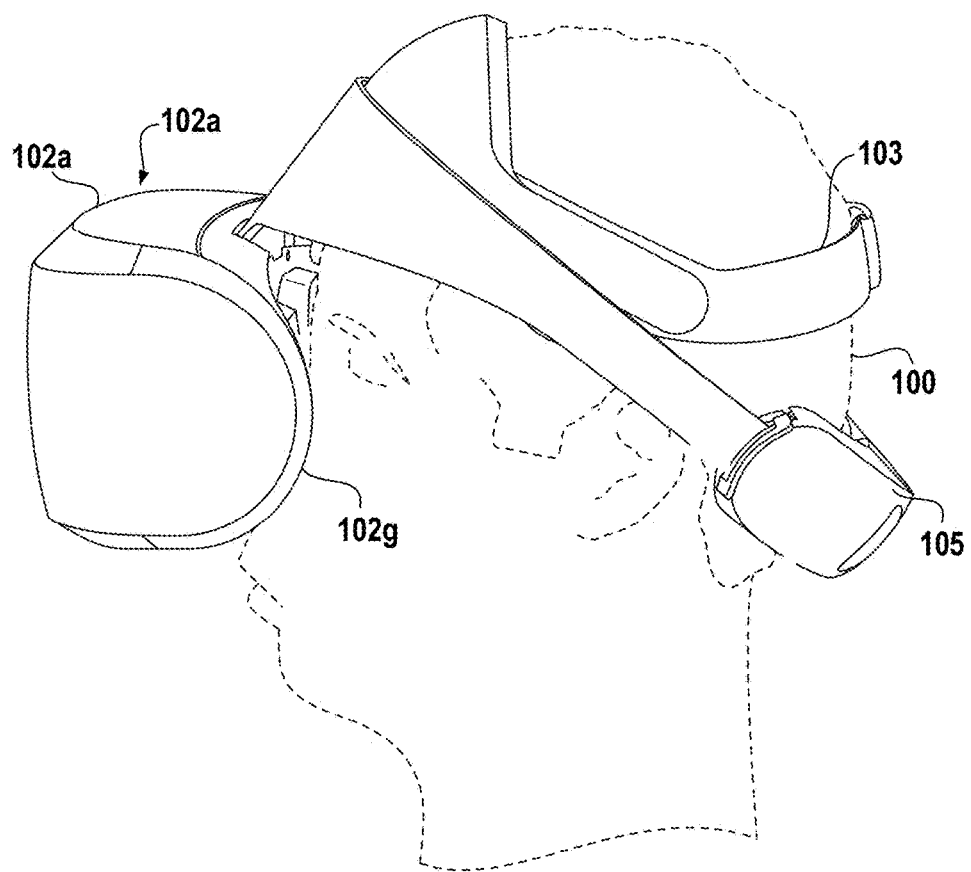
FIG. 1B illustrates a general diagram of one example head mounted display (HMD), when worn on the head of a user.

FIG. 1B illustrates a general diagram of one example head mounted display (HMD) 102, when worn on the head of a user 100. As shown, the HMD 102 includes a display housing 102a, which houses the optics for viewing into a screen of the HMD 102. The display housing 102a includes surfaces that surround a portion of the user space, and generally include an interface surface 102g. The display housing 102a is connected to a head attachment 103, which is configured to sit or attached to the head of the user 100. In one embodiment, the head attachment 103 includes a size adjuster 105, which can be tightened or loosened over the head of the user 100. The head attachment 103 therefore enables the display housing 102a to sit over the front face of the user 100, and proximate to the eyes and nose of the user 100. Typically, the display housing 102a may sit substantially over the eyes of the user 100, and the users nose will typically fit into a nose insert region formed in the lower midsection of the display housing 102a.

Figure 2A:
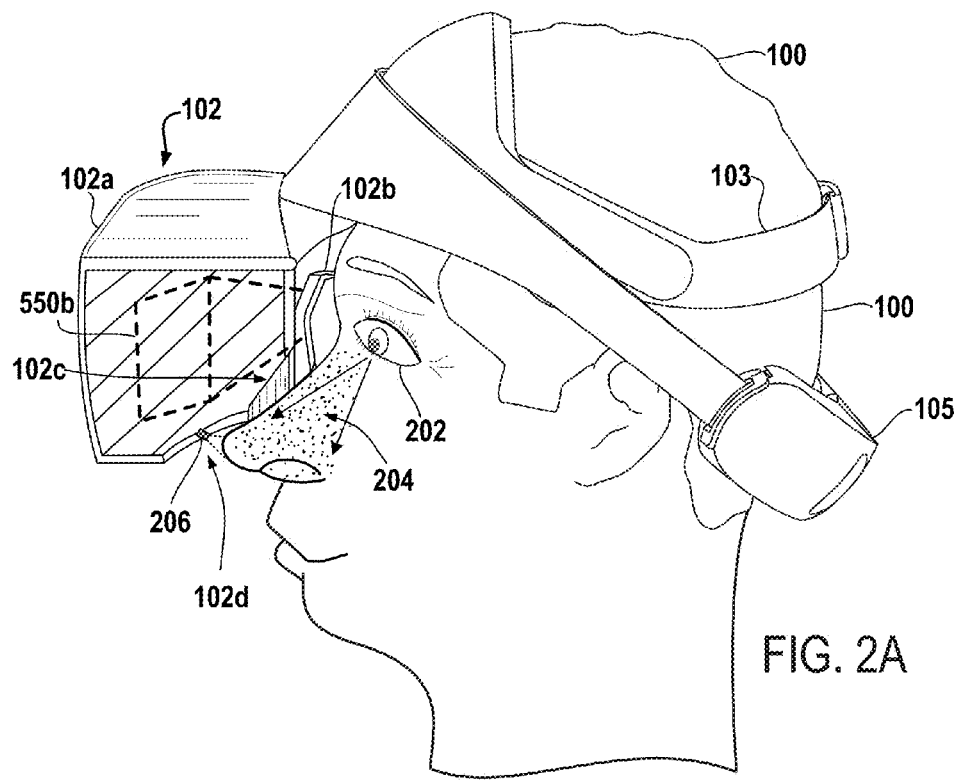
FIG. 2A illustrates the HMD, which has been cut to illustrate a cross-section of the display housing, in accordance with one embodiment.

FIG. 2A illustrates the HMD 102, which has been cut to illustrate a cross-section of the display housing 102a, in accordance with one embodiment. As shown, the display housing 102a will include optics 102b, which are used to provide a focus onto a display screen that is disposed in the display housing 102a. In one embodiment, the screen may be a single screen that is viewable through the optics 102b, or may be provided as two separate screens, one for each eye, but both separate screens are still housed within the display housing 102a. This illustration shows that the nose insert region 102d is located substantially at a midpoint of the display housing 102a, in a lower region, such that the user's nose 204 can substantially sit or fit within the nose insert region 102d. In one embodiment, the display housing 102a will include flaps 102c, which allow the nose 204 to fit into the nose insert region 102d, but substantially reduce the amount of light entering into a region where the user's eyes 202 are focusing through the optics 102b. The flap 102c will be shown in greater detail below, but in one embodiment the flap 102c is provided for each side of the user's nose 204, therefore defining two flaps 102c that allow the users nose 204 to slide into or at least partially into the nose insert region 102d.

In this cross-sectional view, it is shown that a right optic 102b is provided for the right eye 202 of the user. Further shown is a shading of the nose 204 of the user, to illustrate parts of the nose 204 that are not visible to the user when the display housing 102a is placed over the face of the user 100. That is, when the user 100 focuses his eye 202 downward, and the optics are placed proximate to the user's eyes, the optics of the display housing 102a will block the ability of the user to see his nose 204 when looking downward. This provides for an uncomfortable perception to the user 100, when viewing the virtual-reality content.

This uncomfortable perception is particularly evident when the user 100 is viewing the virtual-reality content in which the user is participating in the content space, and the user does not have a nose. Specifically, when the HMD 102 is placed over the face of the user 100, much of the users face is occluded, including the user's nose. As such, when the viewer is looking at virtual-reality content, and traversing virtual-reality spaces, the user is provided with an uncommon view into the spaces, since there is no shadow or perception of a nose where the user's nose is typically located. It is believed that a person's brain will typically account for the fact that his or her nose is present in normal real-world views, and the person's brain will act to minimize or cancel out the view of the person's nose.

Nevertheless, the person's brain understands that the nose is present in front of the user space, and is actively working to cancel out interference of the user's nose, facial features such as cheeks, eyebrows, and other surfaces around the eyes of the user. However, when an HMD 102 is placed over the face of the user, much of the user space is occluded by the HMD 102, including the user's nose. As such, views into the virtual-reality space will appear somewhat confusing or unnatural to the user. The user's brain is expecting to see his or her nose, and/or work to cancel out the fact that the users nose is present. However, since the user's nose has been occluded by the structure of the display housing 102a, images provided to the screen or screens of the display housing 102a will not be rendering any perception or shadows or noses where the user's brain expects there to be a nose or facial feature.

In one embodiment, methods have been defined and structure has been provided in order to identify characteristics of the nose 204 of the user 100. In one embodiment, a proximity sensor 206 is integrated within the display housing 102a to enable the text and of the nose 204 within the nose insert region 102d. As shown in FIG. 2A, the nose 204 is placed within the nose insert region 102d, and a proximity sensor 206 is configured to detect the presence of nose 204.

In one embodiment, the proximity sensor 206 is capable of identifying a distance between the proximity sensor 206 and the surface or surfaces of the nose 204. Using this information, the position of the nose 204 within the nose insert region is identified, in order to determine characteristics of the nose 204. The characteristics of the nose 204 can include geometric surfaces that define shapes or sizes of features of the nose 204. In one embodiment, using information collected by the proximity sensor 206, a process can be enabled to identify a model of the nose that resembles or can be matched closely to the information collected by the proximity sensor 206. The model of the nose can be selected from a database, which can include a plurality of nose sizes and/or nose shapes that resemble or can be matched to information collected from the proximity sensor 206. By way of example, the proximity sensor 206 can determine an approximate size of the nose, and using that size, a look up can be made to the database in order to identify a model for the nose.

In another embodiment, the sensor 206 can be used to identify one or more surface characteristics or geometries of the nose 204. The sensor 206 information can be used to identify features that can be used to generate a model for the nose 204. In some embodiments, the generation of the model for a nose 204 of the user 100 can use information from standard no shapes, which can be extracted in order to generate a model of the nose 204. By way of example, geometric features, sizes, shapes, and other image data can be used in order to generate surfaces that approximate the shape of the nose 204 of the user 100. Generation of the model of the nose is a process that is more customized to the nose of the user 100, and can provide a more realistic or closer matched to the nose of the user 100.

It should be understood that the proximity sensor 206 can be defined by multiple sensors of more than one type, in order to generate or produce data sufficient to map and define geometric surfaces and shapes of the nose 204 the user 100. In another embodiment, multiple data points of the nose 204 of the user 100 can be captured and the generation of the model of the nose 204 of the user 100 can be approximated by accessing previous model noses from one or more databases or one or more previous model generations. In some embodiments, proximity sensor 206 can be defined by one or more of optical sensors, camera sensors, infrared (IR) sensors, ultrasonic sensors, depth sensors, three-dimensional imaging sensors, point-distance capturing sensors, or combinations of two or more thereof. Therefore, although a single proximity sensor 206 is shown in FIG. 2A, it is possible to integrate multiple proximity sensors 206 around the surface of the nose within the display housing 102a.

Figure 2B:
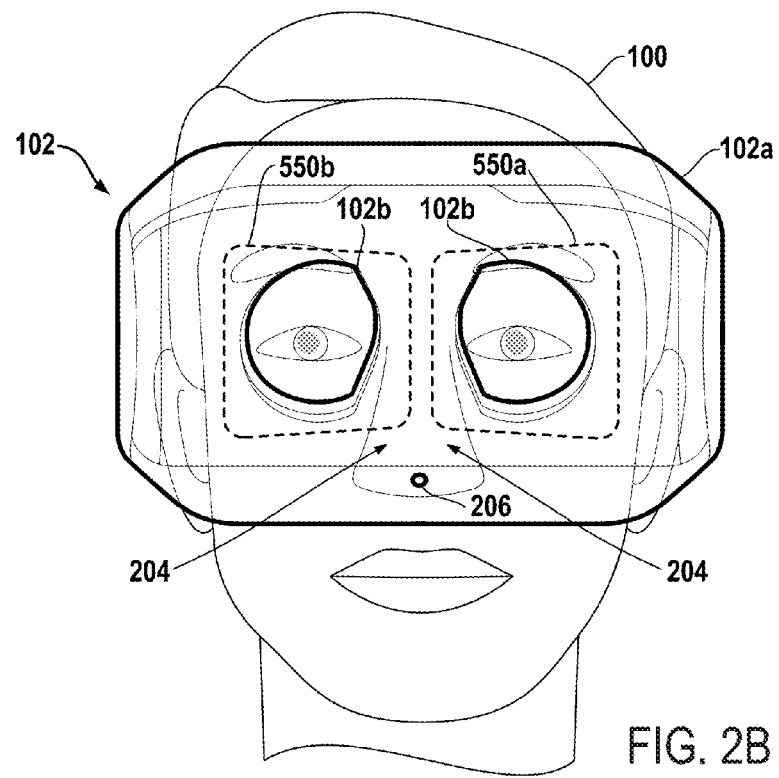
FIG. 2B illustrates a front view of the display housing, which shows how the optics are provided proximate to the eyes of the user.

FIG. 2B illustrates a front view of the display housing 102a, which shows how the optics 102b are provided proximate to the eyes of the user. This configuration shows that substantially most of the face of the user has been occluded when the HMD 102 is placed on the users head for viewing the virtual-reality content. In this view, is it also shown that a right screen 550*b* and a left screen 550*a* are integrated into the display housing 102*a*. The optics 102*b* are configured to provide views into the right and left screens by 550*a* and 550*b*.

In one embodiment, it is also shown that the proximity sensor 206 can be integrated into the display housing 102*a* in the location of the nose insert region 102*d*, such that approximately the tip of the nose 204 of the user 100 can be sensed, identified, imaged, captured, and/or generally examined for characteristic data, including geometric shape, size, texture, color, pigment, movement, and the like. Broadly speaking, a number of sensors can be placed in and around the inside of the display housing 102*a* in order to enable the capturing of characteristics of the nose 204 of the user 100, when wearing the HMD 102.

Figure 2C:
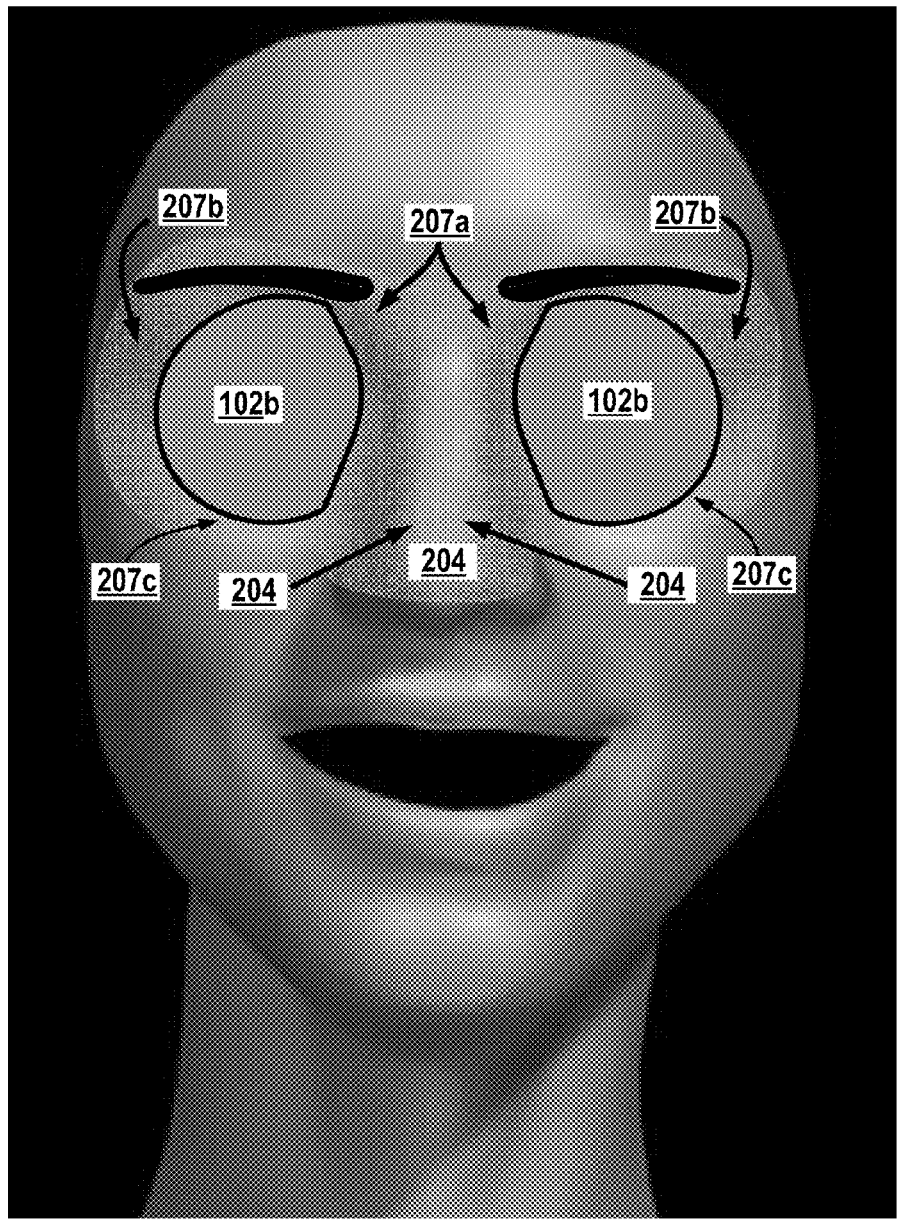
FIG. 2C illustrates an imaged diagram of the user, which captures the facial characteristics and three-dimensional surfaces of the face, in accordance with one embodiment.

FIG. 2C illustrates an imaged diagram of the user 100, which captures the facial characteristics and three-dimensional surfaces of the face, in accordance with one embodiment. By way of example, the image diagram can be captured during a calibration stage of the use of the HMD 102. For instance, the user can be asked to stand in front of the camera or imaging device that can capture the look, the shape, the facial features, textures, sizes, characteristics, surfaces, and other data of the user space. As will be described below, capturing the user space before the user wears the HMD will enable the system to track motions of the user facial features, including the user's mouth, to then use that information to generate avatars faces. An avatar face can be used by an interactive application, so as to communicate to other users the facial expressions of a user wearing an HMD 102. For example, if a first user is wearing an HMD, that first user can be generating facial expressions during the interaction in the virtual space.

Another user viewing the first user, such as another user in the virtual space may see an avatar of the first user. The avatar of the first user will have an avatar face, which may be able to track the facial movements of the first user wearing the HMD 102. For example, it may be possible the track movements of the user's nose 204, the cheeks of the user, the eyebrows of the user, and the mouth of the user. More details regarding the tracking of user facial movements is described below. However, being able to track the user's facial movements will enable the system to share possible emotional states of the HMD user with other users in virtual-reality spaces.

Still with reference to FIG. 2C, it is shown that the optics 102*b* are designed to fit in an area substantially over the eyes of the user 100. When the HMD is worn, the optics being placed proximate to the face, will therefore act to block and occlude views toward the facial features of the user. These occluded features can include, the nose 204, the bridge of the nose 204*a*, the sides of the nose, the width of the nose, the center brow region 207*a*, the upper outer brow region 207*b*, the lower cheek regions 207*c*, and generally portions of the user space that may be viewable by the user's eyes when the HMD 102 is not placed over the users face.

All of these features are considered to be included when the HMD 102 is placed over the head of the user. In one embodiment, the HMD 102 is configured with one or more sensors that are configured to sense the size and shape and geometric surfaces of the nose 204. In another embodiment, the HMD 102 is also configured with one or more sensors that can sense movements of the face of the user, including movements around the user's brow, cheeks, squinting of the eyes, movement of the mouth, and other general or specific facial expressions.

In some embodiments, it is possible to utilize the tracked movements of the face and expressions to identify emotional state of the user. By way of example, if the user is squinting or has provided a pattern of squinting, the user may be tired or identified to be tired. If the user is making facial expressions associated with dizziness, or motion sickness, that information can be used to identify the physiological state of the user. If the user is making erratic facial movements, the movements of the face can be indicative of discomfort, or like or dislike associated with the virtual-reality content.

Therefore, in addition to being able to track the movements and facial expressions of the face of the user to generate avatar faces, the information can also be used to monitor the physiological, emotional, or interests of the user for specific content or pieces of content presented via the HMD 102.

FIGS. 2D-2F illustrates examples of using the display housing 102*a* and sensors integrated within the display housing 102*a* in order to measure or identify or characterize features associated with the nose of different users. For this cross-sectional view, the display housing 102*a* is shown to include the right optic 102*b* that is providing a view into the right screen 550*b*. A proximity sensor 302 can be provided in the display housing 102*a* to identify a distance between the proximity sensor 302 and the face of the user. In one example, the proximity sensor 302 can be directed between the brows of the user, such as the beginning of the user's forehead close to the top of the nose.

The proximity sensor 206, as mentioned above, can be located more closely to the tip or top of the nose of the user. As mentioned above, the HMD 102 can be placed over the users head using the head attachment 103. The head attachment 103 has adjuster 105, which can enable the placement of the display housing 102*a* at various positions relative to the face of the user 100. Depending on the way it's adjusted, the display housing 102*a* can be placed closer to the user's forehead or further from the user's forehead, and depending on the geometries, shapes, sizes, and/or surfaces of the user's nose, the distance between the proximity sensor 206 and the nose of the user will change. Therefore, it is possible to use information regarding proximity sensor 302 and proximity sensor 206, in order to determine separation distances 312*a-c*, and separation distances 316*a-c*. Using this information, it is possible to provide more approximation or closer approximation as to the shape and/or size of the user's nose.

FIG. 2G illustrates an example where additional sensors 318 can be placed within the display housing 102*a*, and directed toward the nose of the user. In this example, a nose bridge sensor 318 can be provided, so as to determine the approximate distance between the sensor 318 and the bridge of the user's nose. Again, this is one example of many where different types of sensors or additional sensors beyond the three shown sensors can be used. Broadly speaking, any number of sensors, whether they be imaging sensors, IR sensors, distance sensors, point sensors, surface mapping sensors, color sensors, depth sensors, cameras, ultrasonic sensors, or combinations thereof may be used to capture information regarding the nose of the user when the HMD 102 is used.

As will be described in more detail below, the information collected from the face of the user, including the nose of the user, can be used to generate image data that can be augmented into the views presented by the screens of the HMD 102. The augmentation of the views can include, for example, integration of image data associated with the user's nose. The placement of this image data can be in locations in the screen that approximate the location of the user's nose when viewed by the user's eyes. By way of example, if a user views downward toward the user's nose without an HMD, the user's nose will be slightly visible or slightly blurry.

The image data presented on the screen or screens of the HMD can be placed in a location that resembles a location of where the user's nose would be if the user looks downward while wearing the HMD. In one embodiment, the image presented in the HMD may be a clear image of a portion of the user's nose. However, since the user is looking downward while wearing the HMD to the image of the user's nose, that image will also appear slightly blurry, just as it would in normal real world viewing without an HMD.

FIGS. 2H-2I illustrate examples of a model of a nose of the user. This model shows a wireframe or skeleton contour generation of a model of a nose that may be generated using information collected from one or more sensors of the display housing 102a of the HMD 102. The wireframe of the nose is shown to have geometric surfaces, contours, shapes, and size. FIG. 2H illustrates a wider size nose, which is also shorter.

FIG. 2I illustrates a narrower size nose, which is also longer. In one embodiment, the model of the nose for a user can be selected from pre-generated models as described above from a database. For example, using information such as position of the nose in the nose insert region 102d, it is possible to identify characteristics of the nose 204, and then identify a model of a nose that best resembles that captured information. In some embodiments, various information points can be gathered from various sensors of the display housing 102a in order to determine the best fit or best selection of a model nose from the database, the best resembles the nose of the user. In another embodiment, the model of the nose can be generated based on sensor data that is captured Fort geometric surfaces of the nose. The generation of the model can be fully customized for the user or can be partially customized for the user.

A fully customized model can be one generated for the very specific nose of the user, using sensor information in order to generate the wireframe of the nose for the user. A partially customized model of the nose can include selecting information from sensors in order to generate a model of the nose using the captured data points and using information from standard nose shapes. In either case, the model of the nose is generated, and can be used to integrate at least a portion of that model of the nose into images rendered on the display screens in the HMD 102.

The integration of the nose images will therefore augment the images presented into the virtual-reality space is generated or produced for the HMD 102. In some embodiments, it is also possible to provide skin pigmentation or color that resembles the actual user, which may have been captured previously by a camera during a calibration stage or from information captured from image data, databases, or social networking sites.

Figure 3A:
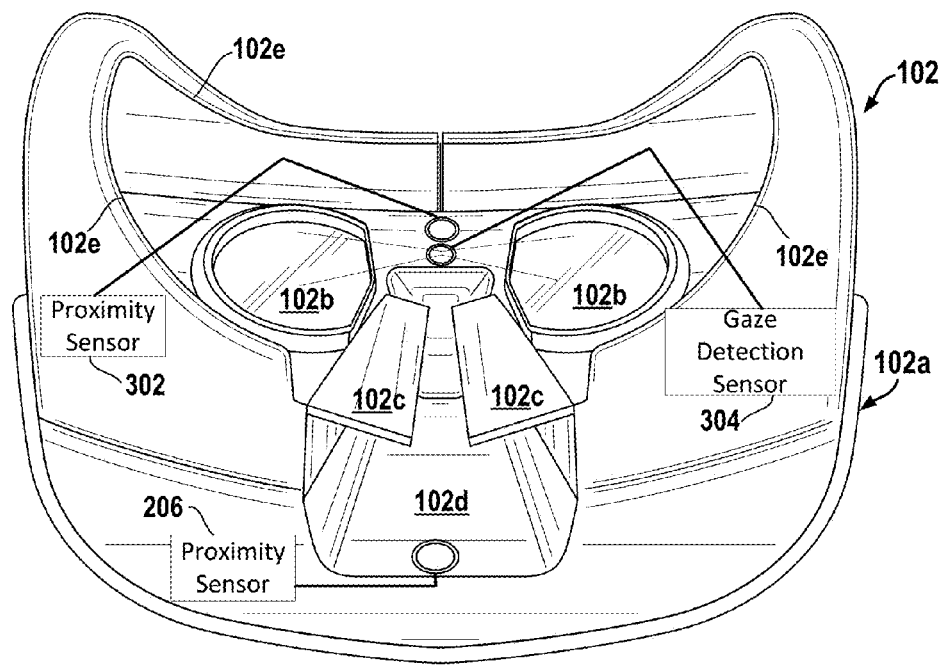
FIGS. 3A and 3B illustrates views of one example display housing, when looking into the inner surfaces where the face is designed to meet with the display housing.
Figure 3B:
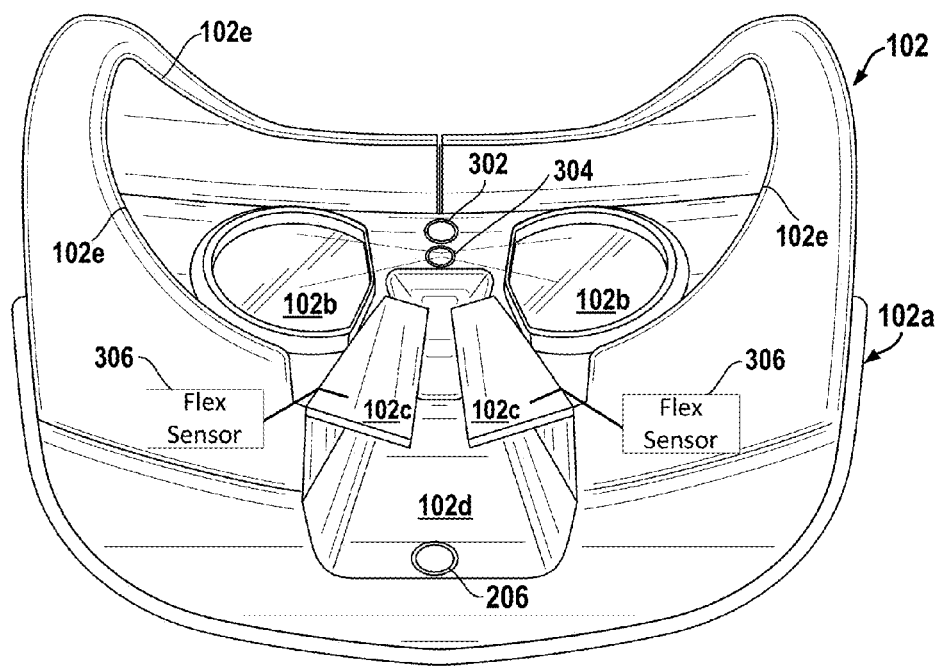

FIGS. 3A and 3B illustrates views of one example display housing 102a, when looking into the inner surfaces where the face is designed to meet with the display housing 102a. As shown, an interface surface 102e surrounds the display housing 102a, so that when worn, the display housing 102a substantially covers the eyes of the user and facial features surrounding the eyes. This provides for reduction in light into the area where the user is viewing through the optics 102b, and therefore provides for more realistic viewing into the virtual-reality scenes provided by the HMD 102. As mentioned above, when the display housing 102a is placed onto the head of the user, the user's nose may slide into or fit within the nose insert region 102d. The nose insert region 102d is an area between the optics 102b, at a lower portion of the display housing 102a.

The flaps 102c, are designed to move or flex when the nose of the user is placed at least partially into the nose insert region 102d. Proximity sensor 206, as shown, is integrated within the display housing 102a and directed toward the area in the nose insert region 102d, so as to capture information when the nose of the user is placed at least partially within the nose insert region 102d. As mentioned above, the flaps 102c are designed to fit adjacent to the user's nose, and the flaps assist in keeping light from filtering toward the optics 102b and the user's eyes when the display housing 102a is placed over the users face. The flaps 102c, in one embodiment, are made of a plastic soft material that can flex or bend in word toward the nose insert region 102d when the user's nose is pressed on the flaps 102c. When the user removes the HMD 102, the flaps 102c will again been back up away from the nose insert region 102d.

The flaps 102c are considered to be optional in one embodiment. Also shown in FIG. 3A, a proximity sensor 302 is integrated into the inner surface of the display housing 102a, and is located between the optics 102b. The placement of the proximity sensor 302 is therefore going to be spaced apart from the user's forehead, which may come closer to the interface surface 102e. However, the presence of the users face in the HMD 102 can be sensed by the proximity sensor 302. Additionally, the proximity sensor 302 can also sense information regarding distance, textures, images, and/or generally characteristics of the users face when the HMD is worn. As mentioned above, the proximity sensor 302 may be defined by multiple sensors, which may be integrated in the same location or in different locations within the display housing 102a.

Also shown is a gaze detection sensor 304, which may be integrated in a location between the optics 102b of the display housing 102a. The gaze detection sensor 304 is configured to monitor the movement of the user's eyes when looking through the optics 102b. The gaze detection sensor can be used to identify locations of where the user is looking in the VR space. In further embodiments, if the user's eyes are monitored using gaze detection sensor 304, this information can be used for the avatar face of the user, so that the avatar face has eyes that moves similar to the movements of the user's eyes. The gaze detection sensor 304 can also be used to monitor when the user may be experiencing motion sickness.

FIG. 3B illustrates another embodiment where a flex sensor 306 is provided. The flex sensor 306 is useful to determine the amount of flexing or movement that the flaps 102c are experiencing when the user places his or her nose into the nose insert region 102d. The amount of movement or flexing of the flaps 102c can be used to identify or approximate a width of the nose of the user or even the length of the nose of the user. In some embodiments, information regarding the flex sensor 306 and also the proximity sensor 206 can be used together, to approximate the size or characteristics of the nose of the user.

Figure 3D:
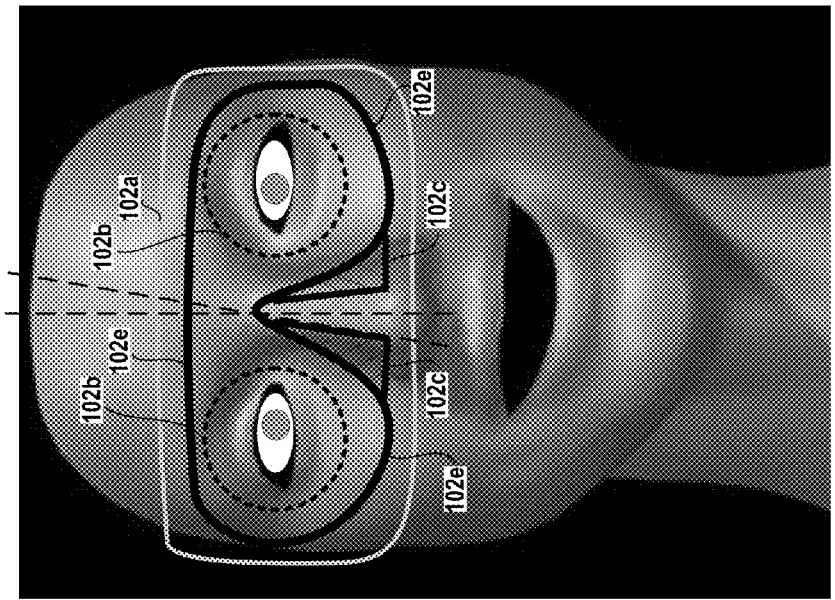
FIGS. 3C and 3D front views of the user's face, when the HMD is worn.
Figure 3C:
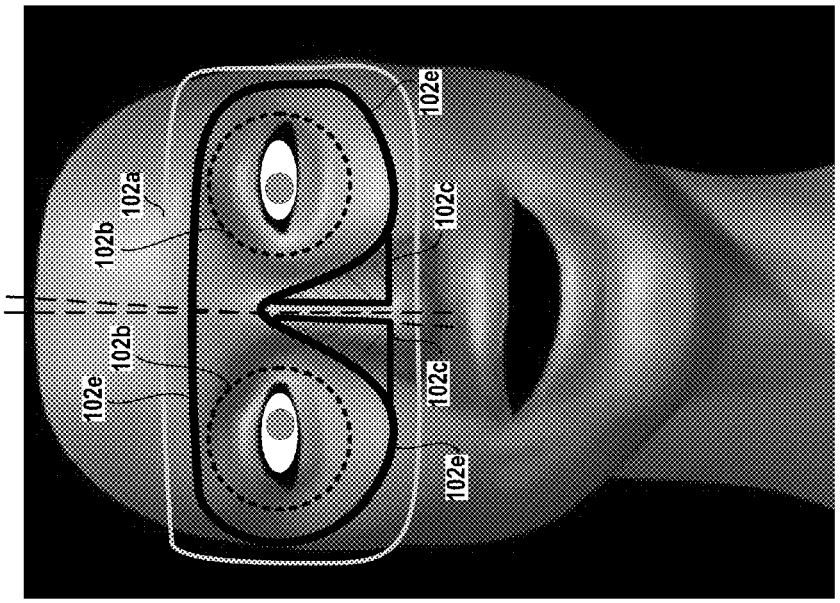

FIGS. 3C and 3D front views of the user's face, when the HMD 102 is worn. As mentioned above, the flaps 102c can be used to approximate the size of the nose of the user. In one embodiment, the amount of movement of the flaps 102c can be approximated by determining an angle by which the flaps have been pressed into the nose insert region 102d. For example, the user in FIG. 3C has pressed in the flaps 102c and angle Φ, whereas the user in FIG. 3D has pressed in the flaps 102c and angle Φ+ΔΦ. The amount of angle change, can be used as one indicator as to the size of the user's nose, which can indicate both length and width. As noted above, the optics 102b are configured to surround the user's eyes, which will necessarily occlude the users face, including facial features that surround the eyes and the nose.

And further, determining the angle by which the flap 102c moves for specific users is only one additional metric that can be used to determine the size of the user's nose. The sensors described above can also be used to determine nose size, and the sensors can be used to generate custom noses that approximate the size of the nose of the user or can be used to identify approximated nose sizes or dimensions from a database of models of noses.

Figure 4A:
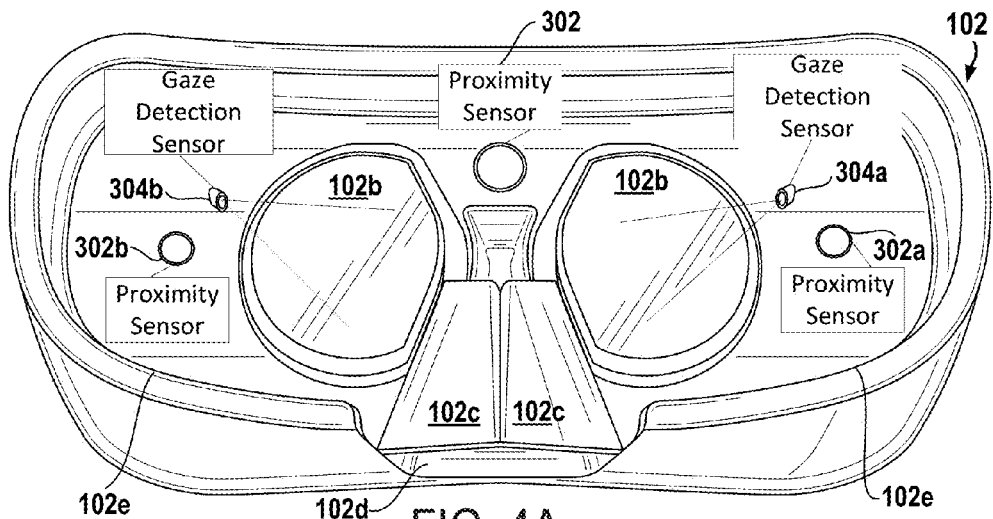
FIGS. 4A-4C illustrates further examples that show the inner portions of an HMD, that further expose the nose insert region 102D and the optics, in accordance with one embodiment.
Figure 4B:
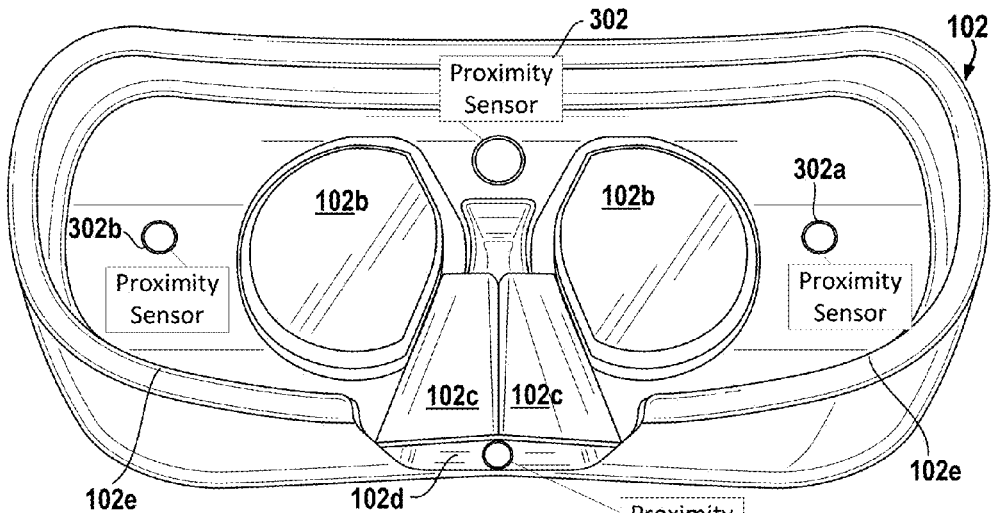
Figure 4C:
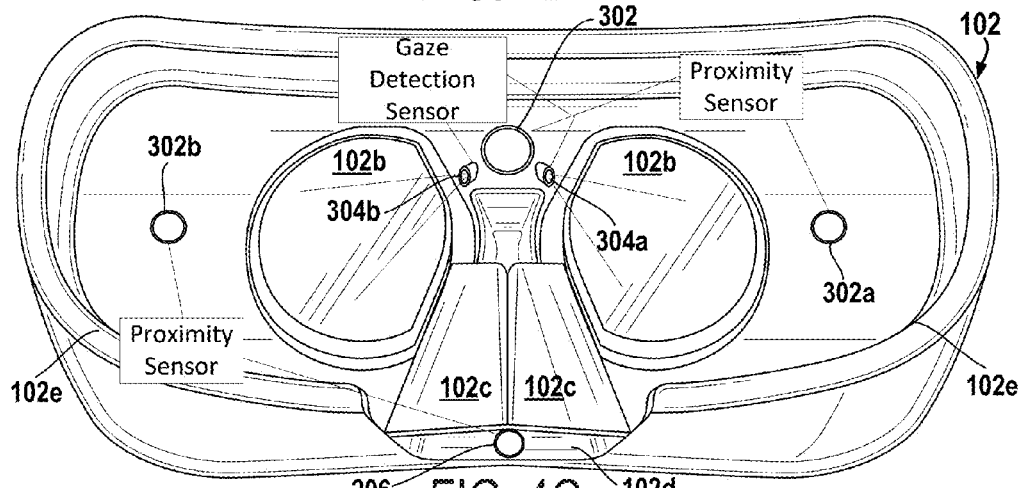

FIGS. 4A-4C illustrates further examples that show the inner portions of an HMD 102, that further expose the nose insert region 102D and the optics 102b, in accordance with one embodiment. It should be noted that any number of sensors can be integrated into the inner surfaces of the HMD 102. By way of example, additional proximity sensors 302a and 302B can be provided in order to determine either distances to the face of the user when the HMD is worn or can be used to determine movements of the user space. The movements of the users face can infer, by way of example, squinting, winking, stress, happiness, emotional indicators, and the like. Proximity sensor 302 can also be provided in a location between the user's eyes, such as the top portion of the user's nose or upper brow. Information from this proximity sensor 302 can also be used to monitor movements of the users face, and can also infer various facial expressions, emotions, potential motion sickness, excitement, sadness, energy level, etc.

FIG. 4A also illustrates an example of gaze detection sensors 304a and 304b placed in the outer portion of the optics 102b, in order to capture eye gaze. FIG. 4C includes gaze detection sensors 304a and 304b located between the optics 102b, in order to capture eye gaze. The location of the gaze detection sensors can vary within the display housing 102a, and generally our position so as to provide a view directed toward the eyes of the user. These illustrations have been provided to show that the gaze detection sensors can be flexibly positioned in different locations within the HMD 102.

FIGS. 5A-5D provide examples of a left screen 550a and a right screen 550b of the HMD 102, which is providing a view into a virtual reality scene. The virtual-reality scene is a car-driving scene, such as one that may be provided by a racing game. It should be understood that the type of content viewable through the HMD can vary, and need not be related to a specific game, but generally to virtual-reality content or scenes presented for viewing via the HMD 102.

Figure 5A:
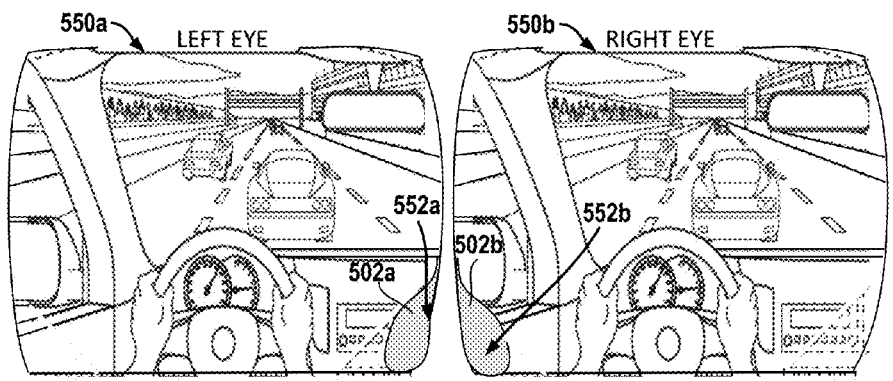
FIGS. 5A-5D provide examples of a left screen and a right screen of the HMD, which is providing a view into a virtual reality scene.

In FIG. 5A, it is shown that the left eye of the user is provided with a screen and the right eye of the user is provided with a screen. Once the user's nose has been processed by the system, using data from one or more sensors and/or the flaps 102c, the model of the user's nose will be known. In some embodiments, the model of the user's nose can be identified and saved to a user profile, which avoids having to identify or process the user's nose each time the user uses the HMD 102.

As shown in FIG. 5A, the bottom right region 552a of the left screen 550a is augmented with nose image data 502a. The bottom left region 552b of the right screen 550b is augmented with nose image data 552b. The nose image data that is augmented into the images rendered of the virtual-reality content is therefore placed in a somewhat viewable location of the screens 550, and are configured to show a partial portion of a model of the user's nose. For example, the area covered by nose image data 502a and 502b, is configured to approximate the size of the user's nose, based on the size of the user's nose obtained from the model of the nose for the user. As mentioned above, the size of the user's nose can include various three-dimensional surface characteristics, such as length, width, shape, etc. The image presented in the screens of the user's nose is a partial view, as would be viewable by a user's eye when looking down toward their nose.

Therefore, the entire nose of the user is not rendered in the image of the virtual-reality content, but simply a side view or portion of the side of the user's nose for the respective side of each eye, when viewed through the left and right screens 550a and 550b. In one embodiment, if the user's nose moves, for example, when the user makes facial expressions, the rendering of the user's nose may also move. Movement of the user's nose and therefore simulate movements that would be typically viewable of the user's own nose when the user moves his face, makes expressions, expresses emotions, speaks, and/or simply views the world. Therefore, the images of the virtual-reality content presented on the screens of the HMD are augmented with nose image data, which is placed strategically in locations where the nose would be when a user is looking forward, or looking downward toward their nose.

Figure 5B:
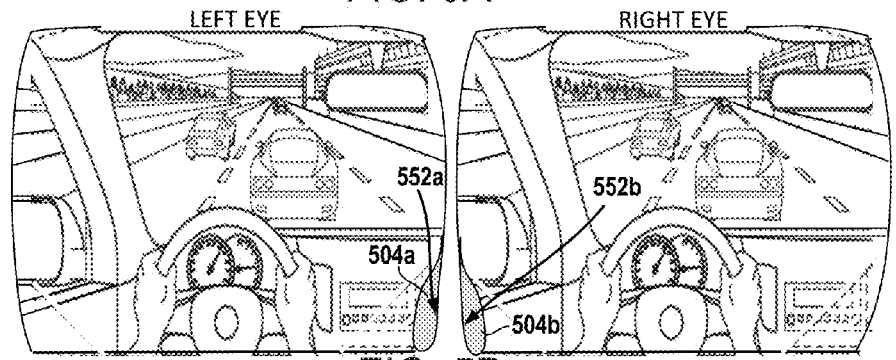

As mentioned above, it is believed that the user's brain will naturally block out any obstruction that would because by the presence of the nose image data, and would in fact provide a more realistic view into the virtual-reality space. This realistic view is therefore provided to more accurately simulate the real world environment, and thus provide more immersive interaction with virtual-reality content. FIG. 5B illustrates an example of the bottom right region 552a and the bottom left region 552b provided with a smaller augmentation of nose image data. In this case, it is possible that the user has a smaller nose model, and that smaller nose model with therefore be used to generate a smaller area of nose image data portrayed into the virtual-reality space. Therefore, it should be understood that the space that is augmented for the image data of the virtual-reality content can change, depending on the size, shape, and general surfaces of the nose and geometries.

Figure 5C:
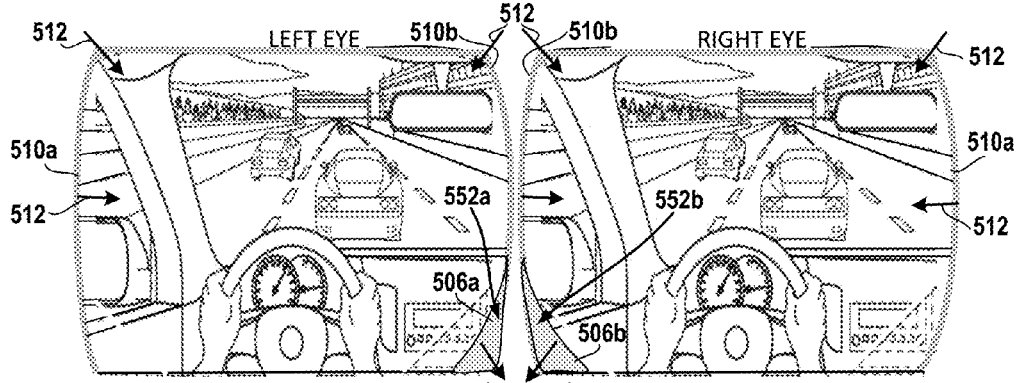

FIG. 5C illustrates an example where the shadow 510a is shown surrounding a periphery of the image content for the virtual-reality space. The shadow 510a is shown to be located substantially outside of the user's left eye and outside of the user's right eye. A shadow 510b can also be provided near regions between the user's eyes, and partially near the user's eyebrows or brow. In some embodiments, the shadow 510a and 510b can be dynamically changed to show movement 512 in word toward the content, depending on the facial expressions detected by the user wearing the HMD 102. As mentioned above, if the user squints, it is possible to see portions of the users face, cheeks, brow, or facial features, when the HMD is not being used. That is, in real life, the user's facial expressions may cause shadows to appear around the user's eyes.

The shadows dynamically appear or disappear, depending on the facial expressions, in real life. When the user is wearing the HMD 102, the shadows are removed, due to the occlusion provided by the HMD 102. The occlusion is, as mentioned above, occlusion that prevents the user's eyes from scene the user's facial features, brow, cheeks, nose, etc.

Figure 5D:
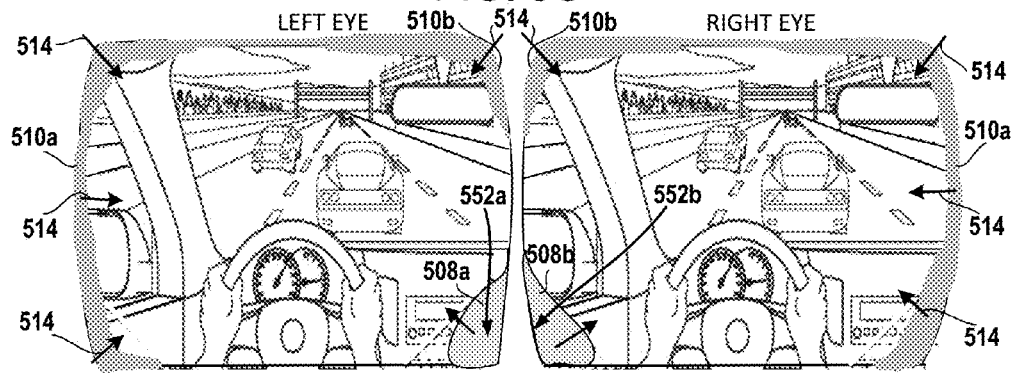

Therefore, a method is provided to dynamically monitor facial expressions using one or more sensors, and based on the monitored facial expressions, adjustments to a shadow can be implemented and augmented onto the images of the virtual-reality content. FIG. 5D illustrates an example where the shadows 510a and 510b are more pronounced, and the shadows are moving in a direction 514 surrounding the content being viewable by the user.

In FIG. 5C, it is also shown that the user's nose for the specific user, may be smaller. The smaller nose with therefore produce nose image data that is augmented into the virtual-reality content images taking up less space near the bottom right region 552a and the bottom left region 552b, in the left screen 550a and the right screen 550b, respectively. The opposite is true in FIG. 5D, where a larger nose is shown. In some embodiments, as the nose may be tracked along with facial expressions, the nose may be moving slightly, which can cause the nose to be rendered at different sizes for different times of interactivity while wearing the HMD 102. These dynamic adjustments of nose size may utilize one or more models for the same user.

Broadly speaking, augmenting the images into virtual-reality content to include images of a user's nose, movements of the user's nose, pigment of the user's nose, shapes and geometries of the user's nose, will enhance the reality or perception of reality experience by a user looking into virtual-reality content. Users are naturally expecting to see a nose in front of their eyes, as this is the case for most users when they are not using an HMD. By introducing this dynamically generated nose, which is a model of a nose that most accurately reflects the user's actual nose, users viewing the virtual-reality content can feel more acclimated to the spaces, content, and interaction. The acclamation for the user's brain will be natural, as the user's brain is already naturally eliminating interruption of the user's nose when the HMD is not being used.

Introducing the user's nose in the virtual-reality content will therefore provide for more realistic interactivity into the virtual-reality content. The same is true when additional facial features are monitored, including movements of those facial features to augment images of the virtual-reality content, which parallel the typical views provided to users through their eyes when an HMD is not being used.

Figure 6A:
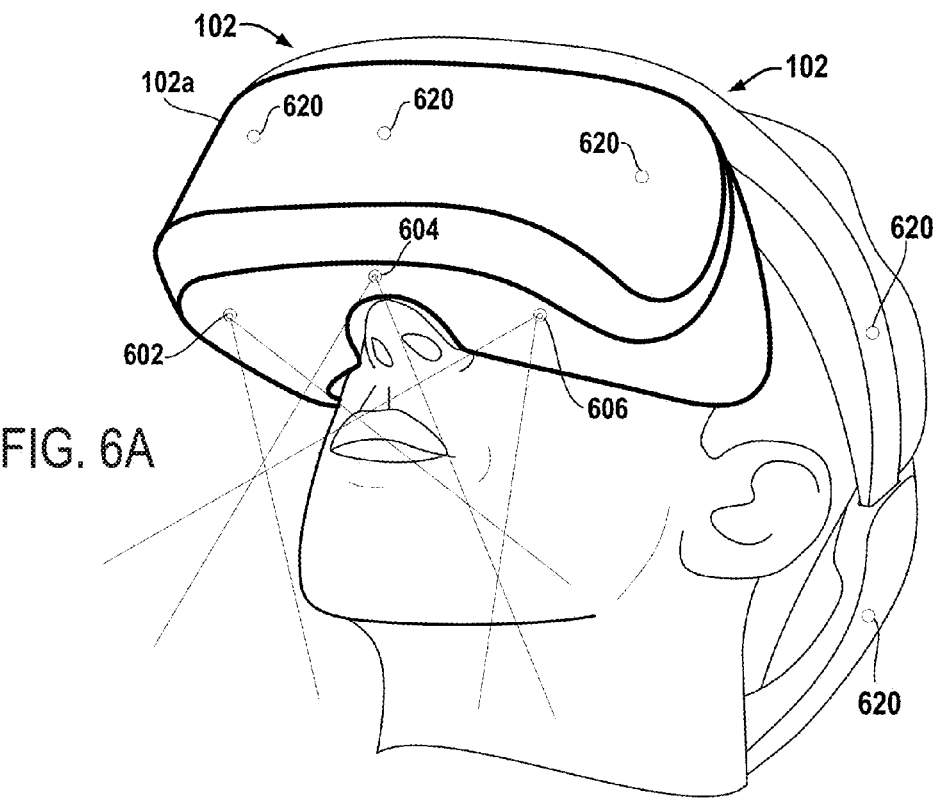
FIGS. 6A and 6B illustrate examples of the display housing of the HMD, having a plurality of outward facing cameras.
Figure 6B:
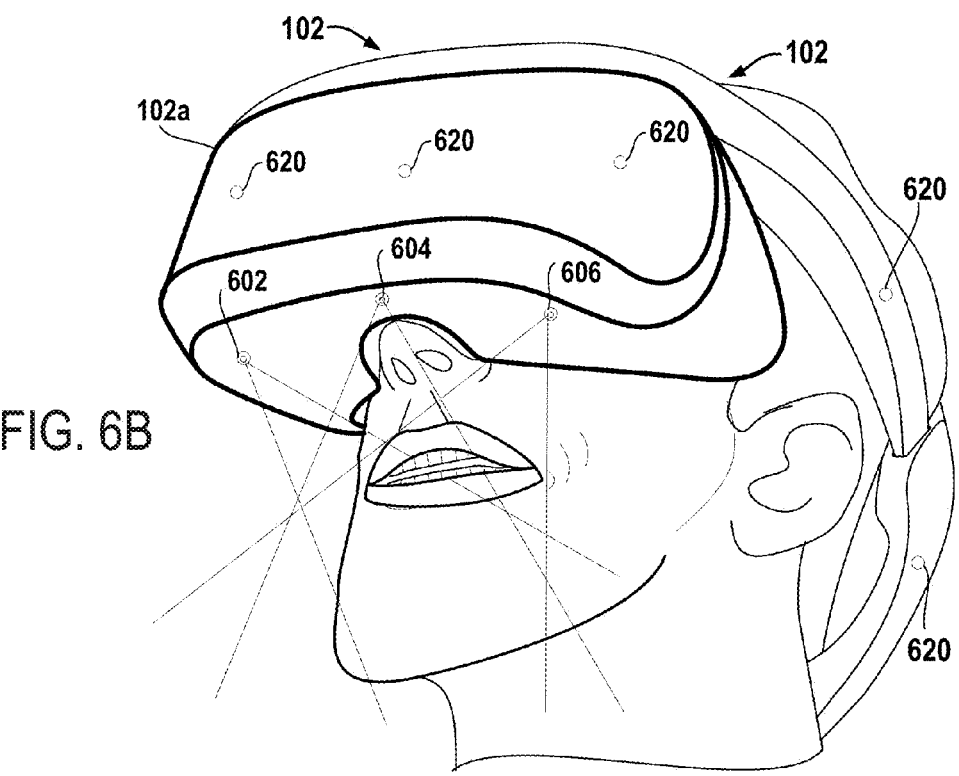

FIGS. 6A and 6B illustrate examples of the display housing 102a of the HMD 102, having a plurality of outward facing cameras. The outward facing cameras can include a plurality of camera 602, 604, and 606, which can be integrated into an under surface of the display housing 102a. In one embodiment, the camera's 602, 604, and 606, can be directed toward the face of the user. Tracking the face of the user below the HMD 102 can enable tracking of facial expressions made by the user 102. The facial expressions may include, for example, movement of the user's mouth. Movement of the user's mouth can be tracked along with movement of the user's jaw and other facial expressions.

By tracking these movements, these movements can be used along with other movements captured by sensors inside the HMD 102 to generate corresponding movements for an avatar of the user, when viewed by another user. As mentioned above, by capturing movements of the user's mouth, and movements of the users face features, it is possible to construct an avatar that tracks the same movements, and these movements can be presented on the screen of another user's HMD, or on a display screen viewable by third parties. By incorporating the expressions by the user's mouth and the user's jawline, it is possible to more accurately depict the possible emotional state, excitement, reactions, and facial expressions when speaking, and simply interacting, when viewed by another person.

In some embodiments, to users wearing HMD's can communicate with each other, and to each other the views of the other person will be views of their avatars. The avatars will move their face and jaw and mouth in similar ways to convey expressions while speaking to each other. In other embodiments, the avatar can be a picture of the user's actual face, to provide a more accurate and realistic view of the person that is being viewed by another person. The picture can be animated based on the tract expressions by the user face, as captured by sensors within the HMD 102 and by sensors located outside of the HMD 102, which may be directed toward the person's face, mouth, neckline, and body that's viewable by the cameras. In some embodiments, the external cameras can also capture motions by the user's hands, limbs, torso, and other viewable body parts.

These motions can be used, in conjunction with the tracked face motions to generate more accurate representations of the user, and can be used to generate avatars or pictures of the user for viewing by other people or people communicating with the person wearing the HMD in a virtual-reality setting. By way of example, it is possible that to HMD users sitting in remote locations may wish to negotiate a contract. During the contract negotiation, the users will view each other as if the users were sitting across the table from each other. The views provided of the others face, when viewed by the other will be the actual face avatar generated, based on the sensed motion, movements, sensed expressions, mouth movements, spoken words, etc.

Thus, when the negotiation is occurring, it is possible for the two users to convey expressions associated with like or dislike regarding the contract. The same can be associated or useful in gaining environments. In gaming environments, it may be desirable for one user to identify the facial expressions of another. If the game environment is a gambling environment, it may be beneficial for one user to see the actual facial expressions of the other, so as to judge whether the user is faking the bet, appearing nervous, or bluffing.

FIGS. 6A and 6B further show examples where multiple external cameras 620 can be integrated at various locations around the head of the user, e.g., attached to surfaces of the display housing 102a or the head attachment 103, or the size adjuster 105, or around the sides of the head attachment 103. The various locations in which cameras may be attached to the HMD 102 can vary, and can be distributed so as to provide a 360° view around the user. These cameras may be useful to provide feedback to the user associated with environmental obstacles, such as things that the user may trip on or bump into. As such, some cameras can be provided to provide safety for the user wearing the HMD 102. In some embodiments, the cameras can be used to generate virtual-reality content which can be shared to a network, and accessed by another HMD user.

It should be understood that the various examples of detecting facial expressions, the sizes shapes and textures and geometries of a nose, and movements of the users mouth and chin can be integrated together to provide more detailed information associated with the user's behavior and emotions. As mentioned above, detecting the user's nose and generate a model of the user's nose can assist in integrating image data associated with the user's nose into the virtual-reality content. Additionally, other facial features can be integrated as image data into the content presented as virtual-reality content.

This type of integration or augmentation of image data presented by the HMD 102 can be facilitated in a dynamic manner. The information can be integrated either immediately in real time when movements are detected by the face of the user, including movements of the user's nose, or can be integrated or augmented based on models known of the user. The models known of the user can be those that have been captured previously, and save to a user profile or user account. Over time, the user account can be updated with changes to the user's facial features. For example, if the user grows a mustache or beard, those changes of the facial features can be updated to the profile of the user.

As such, by identifying the current state of the user space, e.g., by one or more cameras or sensors, it is possible to identify the most current user profile or profile that has information related to the user's current facial features. In some embodiments, the user's facial features and reactions can be characterized over time. For example, the system can learn when a user is happy, sad, frustrated, agitated, becoming dizzy or disoriented, etc. The learning can be facilitated by machine learning algorithms, which save and capture information over time from one or more sessions. The machine learning algorithms can utilize neural networks and deep learning to identify patterns in previous interactions by the user. Using machine learning, it is possible to update profile information for specific users, based on changes of their behaviors and to identify a more accurately the emotional state of the user.

Figure 7A:
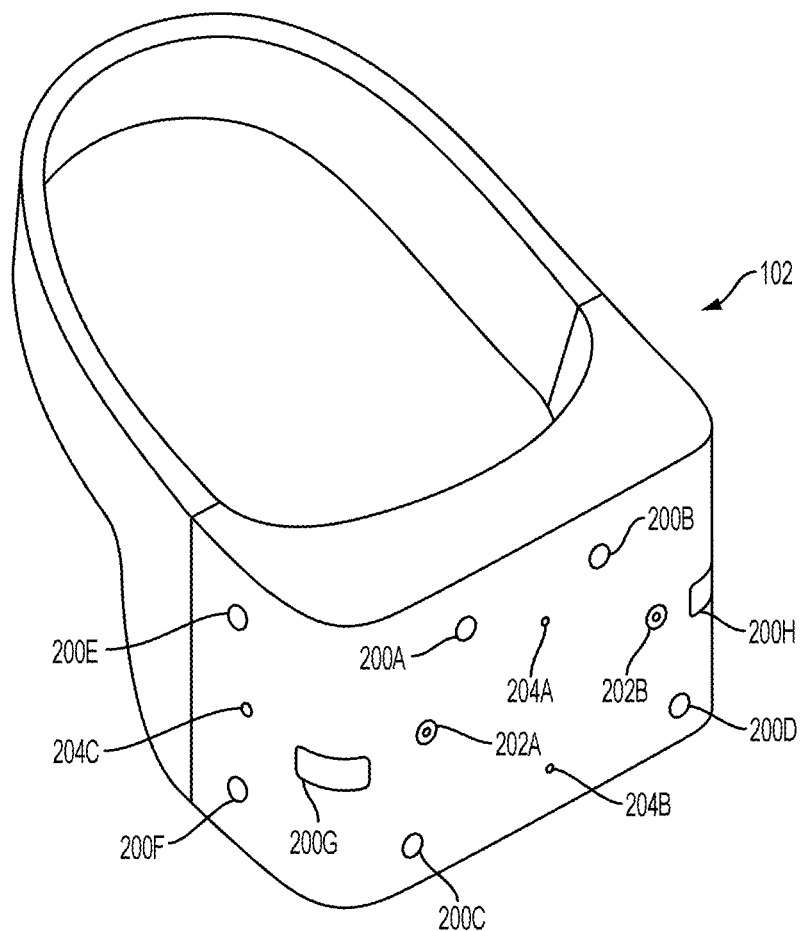
FIG. 7A illustrates a head-mounted display (HMD), in accordance with an embodiment of the disclosure.

FIG. 7A illustrates a head-mounted display (HMD), in accordance with an embodiment of the disclosure. As shown, the HMD 102 includes a plurality of lights 200A-H. Each of these lights may be configured to have specific shapes, and can be configured to have the same or different colors. The lights 200A, 200B, 200C, and 200D are arranged on the front surface of the HMD 102. The lights 200E and 200F are arranged on a side surface of the HMD 102. And the lights 200G and 200H are arranged at corners of the HMD 102, so as to span the front surface and a side surface of the HMD 102. It will be appreciated that the lights can be identified in captured images of an interactive environment in which a user uses the HMD 102. Based on identification and tracking of the lights, the location and orientation of the HMD 102 in the interactive environment can be determined. It will further be appreciated that some of the lights may or may not be visible depending upon the particular orientation of the HMD 102 relative to an image capture device. Also, different portions of lights (e.g. lights 200G and 200H) may be exposed for image capture depending upon the orientation of the HMD 102 relative to the image capture device.

In one embodiment, the lights can be configured to indicate a current status of the HMD to others in the vicinity. For example, some or all of the lights may be configured to have a certain color arrangement, intensity arrangement, be configured to blink, have certain on/off configuration, or other arrangement indicating a current status of the HMD 102. By way of example, the lights can be configured to display different configurations during active gameplay of a video game (generally gameplay occurring during an active timeline or within a scene of the game) versus other non-active gameplay aspects of a video game, such as navigating menu interfaces or configuring game settings (during which the game timeline or scene may be inactive or paused). The lights might also be configured to indicate relative intensity levels of gameplay. For example, the intensity of lights, or a rate of blinking, may increase when the intensity of gameplay increases. In this manner, a person external to the user may view the lights on the HMD 102 and understand that the user is actively engaged in intense gameplay, and may not wish to be disturbed at that moment.

The HMD 102 may additionally include one or more microphones. In the illustrated embodiment, the HMD 102 includes microphones 204A and 204B defined on the front surface of the HMD 102, and microphone 204C defined on a side surface of the HMD 102. By utilizing an array of microphones, sound from each of the microphones can be processed to determine the location of the sound's source. This information can be utilized in various ways, including exclusion of unwanted sound sources, association of a sound source with a visual identification, etc.

The HMD 102 may also include one or more image capture devices. In the illustrated embodiment, the HMD 102 is shown to include image capture devices 202A and 202B. By utilizing a stereoscopic pair of image capture devices, three-dimensional (3D) images and video of the environment can be captured from the perspective of the HMD 102. Such video can be presented to the user to provide the user with a "video see-through" ability while wearing the HMD 102. That is, though the user cannot see through the HMD 102 in a strict sense, the video captured by the image capture devices 202A and 202B (e.g., or one or more front facing cameras 108' disposed on the outside body of the HMD 102, as shown in FIG. 3 below) can nonetheless provide a functional equivalent of being able to see the environment external to the HMD 102 as if looking through the HMD 102. Such video can be augmented with virtual elements to provide an augmented reality experience, or may be combined or blended with virtual elements in other ways. Though in the illustrated embodiment, two cameras are shown on the front surface of the HMD 102, it will be appreciated that there may be any number of externally facing cameras installed on the HMD 102, oriented in any direction. For example, in another embodiment, there may be cameras mounted on the sides of the HMD 102 to provide additional panoramic image capture of the environment.

Figure 7B:
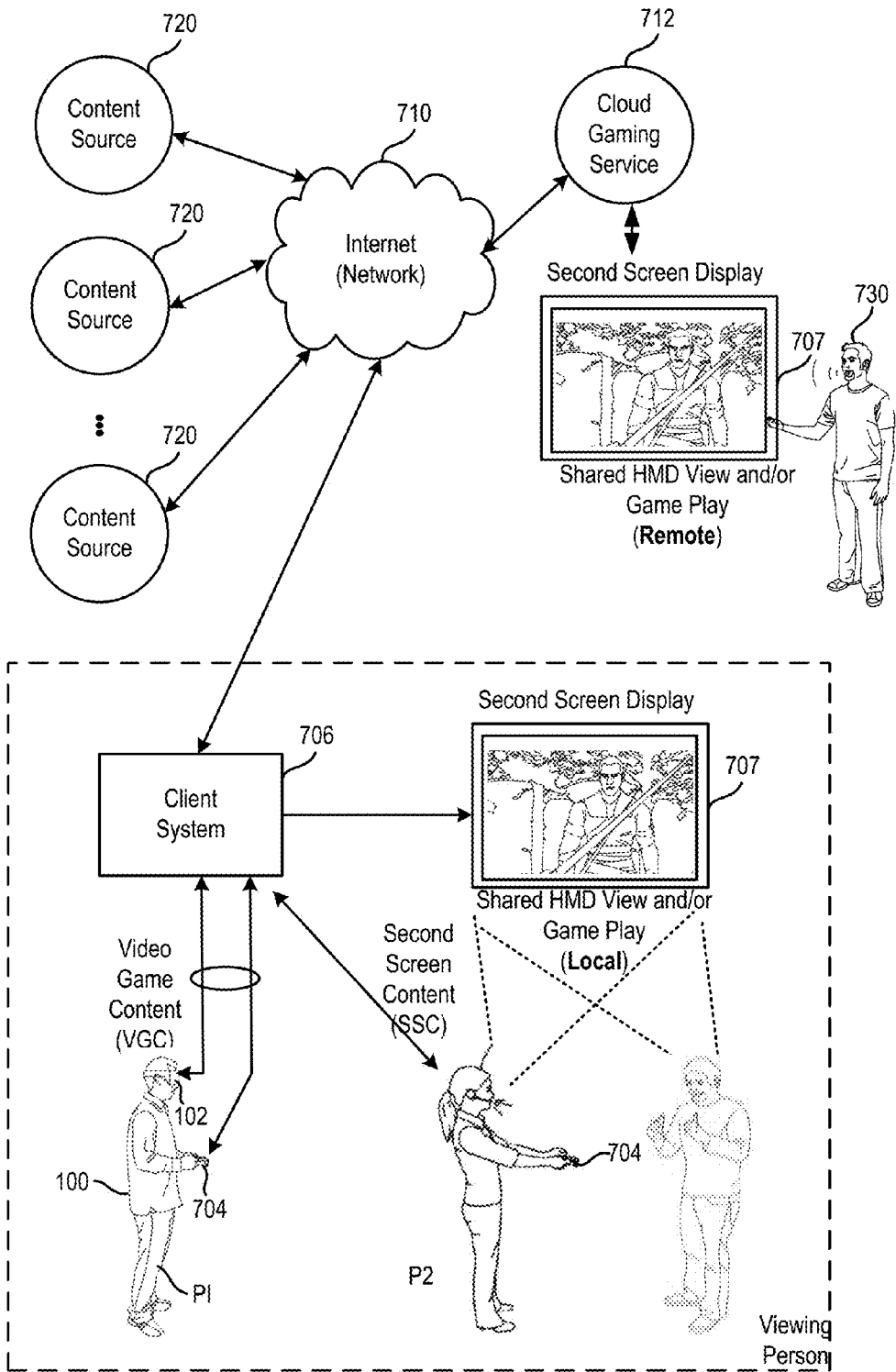
FIG. 7B illustrates one example of an HMD user interfacing with a client system, and the client system providing content to a second screen display, which is referred to as a second screen.

FIG. 7B illustrates one example of an HMD 102 user interfacing with a client system 706, and the client system 706 providing content to a second screen display, which is referred to as a second screen 707. As will be described below, the client system 706 may include integrated electronics for processing the sharing of content from the HMD 102 to the second screen 707. Other embodiments may include a separate device, module, connector, that will interface between the client system and each of the HMD 102 and the second screen 707. In this general example, user 100 is wearing HMD 102 and is playing a video game using controller 704. The interactive play by user 100 will produce video game content (VGC), which is displayed interactively to the HMD 102.

In one embodiment, the content being displayed in the HMD 102 is shared to the second screen 707. In one example, a person viewing the second screen 707 can view the content being played interactively in the HMD 102 by user 100. In another embodiment, another user (e.g. player 2) can interact with the client system 706 to produce second screen content (SSC). The second screen content produced by a player also interacting with the controller 704 (or any type of user interface, gesture, voice, or input), may be produced as SSC to the client system 706, which can be displayed on second screen 707 along with the VGC received from the HMD 102.

Accordingly, the interactivity by other users who may be co-located or remote from an HMD user can be social, interactive, and more immersive to both the HMD user and users that may be viewing the content played by the HMD user on a second screen 707. As illustrated, the client system 706 can be connected to the Internet 710. The Internet can also provide access to the client system 706 to content from various content sources 720. The content sources 720 can include any type of content that is accessible over the Internet.

Such content, without limitation, can include video content, movie content, streaming content, social media content, news content, friend content, advertisement content, etc. In one embodiment, the client system 706 can be used to simultaneously process content for an HMD user, such that the HMD is provided with multimedia content associated with the interactivity during gameplay. The client system 706 can then also provide other content, which may be unrelated to the video game content to the second screen. The client system 706 can, in one embodiment receive the second screen content from one of the content sources 720, or from a local user, or a remote user.

Figure 8:
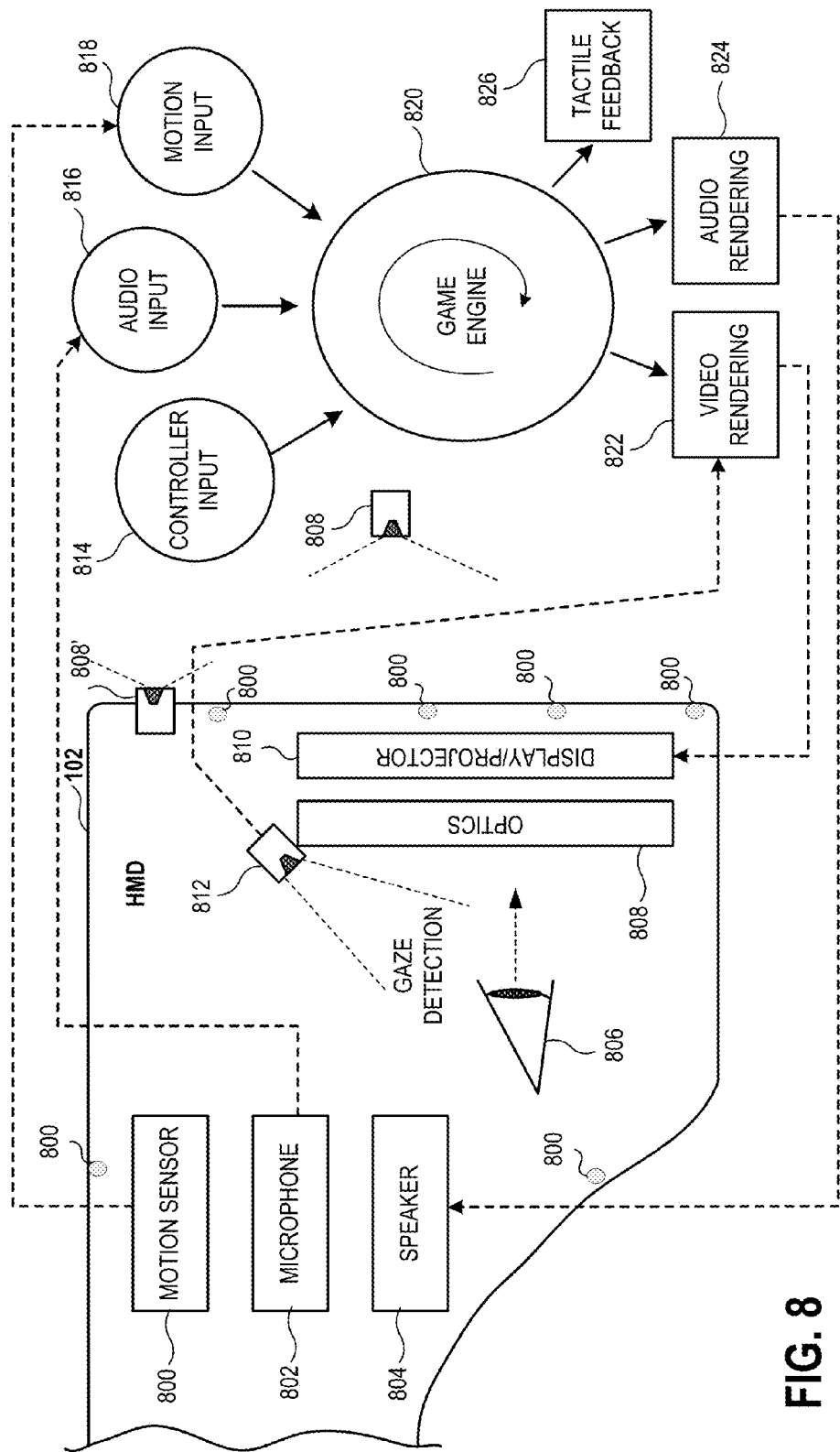
FIG. 8 conceptually illustrates the function of the HMD in conjunction with an executing video game, in accordance with an embodiment of the disclosure.

FIG. 8 conceptually illustrates the function of the HMD 102 in conjunction with an executing video game, in accordance with an embodiment of the disclosure. The executing video game is defined by a game engine 820 which receives inputs to update a game state of the video game. The game state of the video game can be defined, at least in part, by values of various parameters of the video game which define various aspects of the current gameplay, such as the presence and location of objects, the conditions of a virtual environment, the triggering of events, user profiles, view perspectives, etc.

In the illustrated embodiment, the game engine receives, by way of example, controller input 814, audio input 816 and motion input 818. The controller input 814 may be defined from the operation of a gaming controller separate from the HMD 102, such as a handheld gaming controller (e.g. Sony DUALSHOCK®4 wireless controller, Sony PlayStation® Move motion controller) or glove interface object 104a. By way of example, controller input 814 may include directional inputs, button presses, trigger activation, movements, gestures, or other kinds of inputs processed from the operation of a gaming controller. The audio input 816 can be processed from a microphone 802 of the HMD 102, or from a microphone included in the image capture device 108 or elsewhere in the local environment. The motion input 818 can be processed from a motion sensor 800 included in the HMD 102, or from image capture device 108 as it captures images of the HMD 102. The game engine 820 receives inputs which are processed according to the configuration of the game engine to update the game state of the video game. The game engine 820 outputs game state data to various rendering modules which process the game state data to define content which will be presented to the user.

In the illustrated embodiment, a video rendering module 822 is defined to render a video stream for presentation on the HMD 102. The video stream may be presented by a display/projector mechanism 810, and viewed through optics 808 by the eye 806 of the user. An audio rendering module 804 is configured to render an audio stream for listening by the user. In one embodiment, the audio stream is output through a speaker 804 associated with the HMD 102. It should be appreciated that speaker 804 may take the form of an open air speaker, headphones, or any other kind of speaker capable of presenting audio.

In one embodiment, a gaze tracking camera 812 is included in the HMD 102 to enable tracking of the gaze of the user. The gaze tracking camera captures images of the user's eyes, which are analyzed to determine the gaze direction of the user. In one embodiment, information about the gaze direction of the user can be utilized to affect the video rendering. For example, if a user's eyes are determined to be looking in a specific direction, then the video rendering for that direction can be prioritized or emphasized, such as by providing greater detail or faster updates in the region where the user is looking. It should be appreciated that the gaze direction of the user can be defined relative to the head mounted display, relative to a real environment in which the user is situated, and/or relative to a virtual environment that is being rendered on the head mounted display.

Broadly speaking, analysis of images captured by the gaze tracking camera 812, when considered alone, provides for a gaze direction of the user relative to the HMD 102. However, when considered in combination with the tracked location and orientation of the HMD 102, a real-world gaze direction of the user can be determined, as the location and orientation of the HMD 102 is synonymous with the location and orientation of the user's head. That is, the real-world gaze direction of the user can be determined from tracking the positional movements of the user's eyes and tracking the location and orientation of the HMD 102. When a view of a virtual environment is rendered on the HMD 102, the real-world gaze direction of the user can be applied to determine a virtual world gaze direction of the user in the virtual environment.

Additionally, a tactile feedback module 826 is configured to provide signals to tactile feedback hardware included in either the HMD 102 or another device operated by the user, such as a controller 104. The tactile feedback may take the form of various kinds of tactile sensations, such as vibration feedback, temperature feedback, pressure feedback, etc.

At present, streaming services for sharing game replays are very popular. The DualShock®4 wireless controller includes a "share button" directly on the controller to enable such sharing. Implementations of the present disclosure improve sharing replays for people who wish to explore the replays using an HMD/VR headset. Implementations of the present disclosure provide for rendering of a game replay with a very wide field of view to allow the spectator to move his head freely using an HMD and view the replay from novel vantage points. The traditional streaming approach would limit the replay to only what the original player viewed, so that the view direction would be independent of the spectator's head position and orientation, and if the spectator using an HMD moved his head, nothing would change.

Implementations of the disclosure provide for the rendering of videos in a wide enough field of view to support novel viewpoints in an HMD. A custom build of a game engine that runs on a cloud server (e.g. on console gaming hardware, e.g. PlayStation®4 hardware, in the cloud), that accepts as input game state streamed from the original player's game engine and uses it to render an extremely wide field of view (e.g. 150 degree plus) view of the game, that can then be used for real-time streaming and/or pre-recorded playback of that game session. It will be appreciated that the extremely wide field of view is in excess of the HMD's field of view, allowing for the spectator wearing the HMD to look around in the replay. The actual game is configured to stream its state to the networked version of the engine.

As described above, there is a need to provide users the ability to spectate, e.g., watch the interactive activity being experienced by users wearing HMDs 102. For example, one HMD virtual reality player may be immersed in the activity presented in the HMD, while other persons may be co-located with the player. These other co-located players may find enjoyment in watching the interactivity experienced or virtual reality scene being viewed by the HMD player. As used herein, an HMD player is one that is viewing content presented on the HMD, or can be one that is interacting with some content resented on the HMD, or can be playing a game presented on the HMD. As such, reference to the player, is only made with reference to the user that is wearing the HMD, irrespective of the type of content being presented on the HMD.

In still other embodiments, other persons that are not co-located with the HMD player may wish to view the content, interactivity, or media being presented in the HMD of the HMD player. For instance, a website may be provided to present users with the ability to select from different HMD players, so as to watch and spectate while the HMD player performs his or her activities. This example is similar to standard Twitch-type experiences, which allow users connected to the Internet to access the website and search for different types of content or media being played by remote players. The remote players may, in some embodiments, be playing games using an HMD 102.

In other embodiments, the remote players may be playing games or watching content using a display screen of a device or a television display screen. Broadly speaking, users wishing to watch the activity of another player that is remote, e.g., over a website, can then select specific players or types of games, or thumbnails of the games, or thumbnails of the content, to view the activity being directed by the HMD player. Thus, a website can be provided that enables users to view and select specific interactive content that may be actively played by a remote HMD player. The remote viewer wishing to view the activity by the HMD player, can simply click on that content and begin watching.

Figure 9:
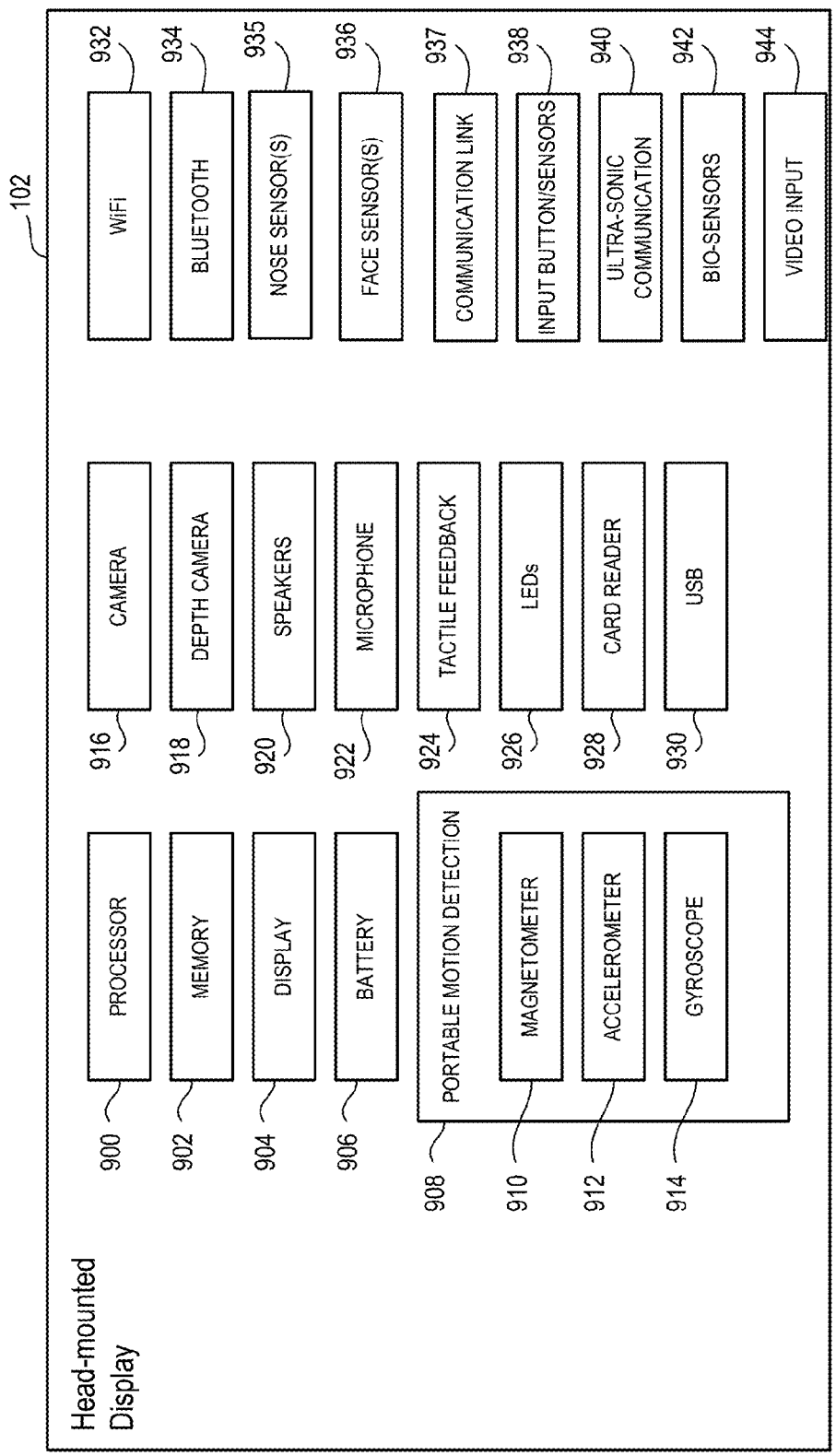
FIG. 9 illustrates components of a head-mounted display, in accordance with an embodiment of the disclosure.

With reference to FIG. 9, a diagram illustrating components of a head-mounted display 102 is shown, in accordance with an embodiment of the disclosure. The head-mounted display 102 includes a processor 900 for executing program instructions. A memory 902 is provided for storage purposes, and may include both volatile and non-volatile memory. A display 904 is included which provides a visual interface that a user may view. A battery 906 is provided as a power source for the head-mounted display 102. A motion detection module 908 may include any of various kinds of motion sensitive hardware, such as a magnetometer 910, an accelerometer 912, and a gyroscope 914.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 912 are used to provide the direction of gravity, which gives an absolute reference for two angles (world-space pitch and world-space roll).

A magnetometer measures the strength and direction of the magnetic field in the vicinity of the head-mounted display. In one embodiment, three magnetometers 910 are used within the head-mounted display, ensuring an absolute reference for the world-space yaw angle. In one embodiment, the magnetometer is designed to span the earth magnetic field, which is ±80 microtesla. Magnetometers are affected by metal, and provide a yaw measurement that is monotonic with actual yaw. The magnetic field may be warped due to metal in the environment, which causes a warp in the yaw measurement. If necessary, this warp can be calibrated using information from other sensors such as the gyroscope or the camera. In one embodiment, accelerometer 912 is used together with magnetometer 910 to obtain the inclination and azimuth of the head-mounted display 102.

In some implementations, the magnetometers of the head-mounted display are configured so as to be read during times when electromagnets in other nearby devices are inactive.

A gyroscope is a device for measuring or maintaining orientation, based on the principles of angular momentum. In one embodiment, three gyroscopes 914 provide information about movement across the respective axis (x, y and z) based on inertial sensing. The gyroscopes help in detecting fast rotations. However, the gyroscopes can drift overtime without the existence of an absolute reference. This requires resetting the gyroscopes periodically, which can be done using other available information, such as positional/orientation determination based on visual tracking of an object, accelerometer, magnetometer, etc.

A camera 916 is provided for capturing images and image streams of a real environment. More than one camera may be included in the head-mounted display 102, including a camera that is rear-facing (directed away from a user when the user is viewing the display of the head-mounted display 102), and a camera that is front-facing (directed towards the user when the user is viewing the display of the head-mounted display 102). Additionally, a depth camera 918 may be included in the head-mounted display 102 for sensing depth information of objects in a real environment.

The head-mounted display 102 includes speakers 920 for providing audio output. Also, a microphone 922 may be included for capturing audio from the real environment, including sounds from the ambient environment, speech made by the user, etc. The head-mounted display 102 includes tactile feedback module 924 for providing tactile feedback to the user. In one embodiment, the tactile feedback module 924 is capable of causing movement and/or vibration of the head-mounted display 102 so as to provide tactile feedback to the user.

LEDs 926 are provided as visual indicators of statuses of the head-mounted display 102. For example, an LED may indicate battery level, power on, etc. A card reader 928 is provided to enable the head-mounted display 102 to read and write information to and from a memory card. A USB interface 930 is included as one example of an interface for enabling connection of peripheral devices, or connection to other devices, such as other portable devices, computers, etc. In various embodiments of the head-mounted display 102, any of various kinds of interfaces may be included to enable greater connectivity of the head-mounted display 102.

A WiFi module 932 is included for enabling connection to the Internet or a local area network via wireless networking technologies. Also, the head-mounted display 102 includes a Bluetooth module 934 for enabling wireless connection to other devices. In one embodiment, the HMD 102 can also include nose sensors 935. The nose sensors can be defined by one or more proximity sensors, which can include one or more of optical sensors, cameras, camera sensors, infrared (IR) sensors, ultrasonic sensors, depth sensors, three-dimensional imaging sensors, point-distance capturing sensors, RGB camera's, multiple point cameras, color sensing cameras, or combinations of two or more thereof. The face sensors 936, for example, can include imaging cameras, motion detection cameras, image sensing cameras, ultrasonic sensors, depth sensors, three-dimensional imaging sensors, infrared sensors, ultrasonic imagers, or combinations thereof, or similar or additional cameras that may be also utilized or used in conjunction with the nose sensors 935. In some embodiments, the face sensors 936 can also include cameras that are exterior to the HMD 102, such as those that may be facing the user's mouth, chin, jawline, or the like.

A communications link 937 may also be included for connection to other devices. In one embodiment, the communications link 937 utilizes infrared transmission for wireless communication. In other embodiments, the communications link 937 may utilize any of various wireless or wired transmission protocols for communication with other devices.

Input buttons/sensors 938 are included to provide an input interface for the user. Any of various kinds of input interfaces may be included, such as buttons, touchpad, joystick, trackball, etc. An ultra-sonic communication module 940 may be included in head-mounted display 102 for facilitating communication with other devices via ultra-sonic technologies.

Bio-sensors 942 are included to enable detection of physiological data from a user. In one embodiment, the bio-sensors 942 include one or more dry electrodes for detecting bio-electric signals of the user through the user's skin.

A video input 944 is configured to receive a video signal from a primary processing computer (e.g. main game console) for rendering on the HMD. In some implementations, the video input is an HDMI input.

The foregoing components of head-mounted display 102 have been described as merely exemplary components that may be included in head-mounted display 102. In various embodiments of the disclosure, the head-mounted display 102 may or may not include some of the various aforementioned components. Embodiments of the head-mounted display 102 may additionally include other components not presently described, but known in the art, for purposes of facilitating aspects of the present disclosure as herein described.

Figure 10:
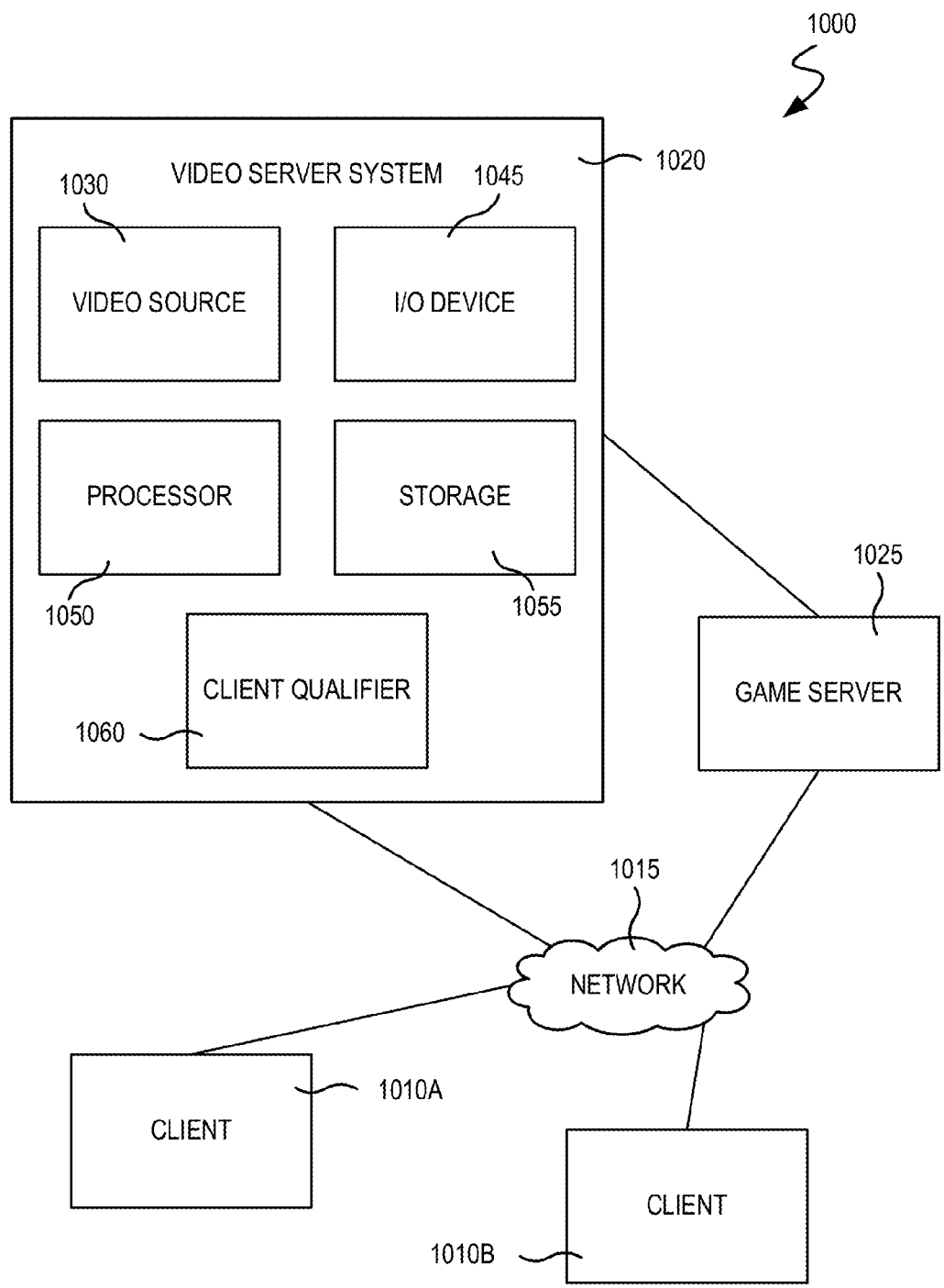
FIG. 10 is a block diagram of a Game System, according to various embodiments of the disclosure.

FIG. 10 is a block diagram of a Game System 1000, according to various embodiments of the disclosure. Game System 1000 is configured to provide a video stream to one or more Clients 1010 via a Network 1015. Game System 1000 typically includes a Video Server System 1020 and an optional game server 1025. Video Server System 1020 is configured to provide the video stream to the one or more Clients 1010 with a minimal quality of service. For example, Video Server System 1020 may receive a game command that changes the state of or a point of view within a video game, and provide Clients 1010 with an updated video stream reflecting this change in state with minimal lag time. The Video Server System 1020 may be configured to provide the video stream in a wide variety of alternative video formats, including formats yet to be defined. Further, the video stream may include video frames configured for presentation to a user at a wide variety of frame rates. Typical frame rates are 30 frames per second, 60 frames per second, and 120 frames per second. Although higher or lower frame rates are included in alternative embodiments of the disclosure.

Clients 1010, referred to herein individually as 1010A., 1010B., etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1010 are configured to receive encoded video streams, decode the video streams, and present the resulting video to a user, e.g., a player of a game. The processes of receiving encoded video streams and/or decoding the video streams typically includes storing individual video frames in a receive buffer of the Client. The video streams may be presented to the user on a display integral to Client 1010 or on a separate device such as a monitor or television. Clients 1010 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1010 are optionally geographically dispersed. The number of clients included in Game System 1000 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1020 to deliver a game viewed through the HMD. In one embodiment, the game console receives the video stream from the video server system 1020, and the game console forwards the video stream, or updates to the video stream, to the HMD for rendering.

Clients 1010 are configured to receive video streams via Network 1415. Network 1015 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1010 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1010 may, but are not required to, further include systems configured for modifying received video. For example, a Client may be configured to perform further rendering, to overlay one video image on another video image, to crop a video image, and/or the like. For example, Clients 1010 may be configured to receive various types of video frames, such as I-frames, P-frames and B-frames, and to process these frames into images for display to a user. In some embodiments, a member of Clients 1010 is configured to perform further rendering, shading, conversion to 3-D, or like operations on the video stream. A member of Clients 1010 is optionally configured to receive more than one audio or video stream. Input devices of Clients 1010 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1010 is generated and provided by Video Server System 1020. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1010 are typically configured to receive inputs from a user. These inputs may include game commands configured to change the state of the video game or otherwise affect game play. The game commands can be received using input devices and/or may be automatically generated by computing instructions executing on Clients 1010. The received game commands are communicated from Clients 1010 via Network 1015 to Video Server System 1020 and/or Game Server 1025. For example, in some embodiments, the game commands are communicated to Game Server 1025 via Video Server System 1020. In some embodiments, separate copies of the game commands are communicated from Clients 1010 to Game Server 1025 and Video Server System 1020. The communication of game commands is optionally dependent on the identity of the command. Game commands are optionally communicated from Client 1010A through a different route or communication channel that that used to provide audio or video streams to Client 1010A.

Game Server 1025 is optionally operated by a different entity than Video Server System 1020. For example, Game Server 1025 may be operated by the publisher of a multiplayer game. In this example, Video Server System 1020 is optionally viewed as a client by Game Server 1025 and optionally configured to appear from the point of view of Game Server 1025 to be a prior art client executing a prior art game engine. Communication between Video Server System 1020 and Game Server 1025 optionally occurs via Network 1015. As such, Game Server 1025 can be a prior art multiplayer game server that sends game state information to multiple clients, one of which is game server system 1020. Video Server System 1020 may be configured to communicate with multiple instances of Game Server 1025 at the same time. For example, Video Server System 1020 can be configured to provide a plurality of different video games to different users. Each of these different video games may be supported by a different Game Server 1025 and/or published by different entities. In some embodiments, several geographically distributed instances of Video Server System 1020 are configured to provide game video to a plurality of different users. Each of these instances of Video Server System 1020 may be in communication with the same instance of Game Server 1025. Communication between Video Server System 1020 and one or more Game Server 1025 optionally occurs via a dedicated communication channel. For example, Video Server System 1020 may be connected to Game Server 1025 via a high bandwidth channel that is dedicated to communication between these two systems.

Video Server System 1020 comprises at least a Video Source 1030, an I/O Device 1045, a Processor 1050, and non-transitory Storage 1055. Video Server System 1020 may include one computing device or be distributed among a plurality of computing devices. These computing devices are optionally connected via a communications system such as a local area network.

Video Source 1030 is configured to provide a video stream, e.g., streaming video or a series of video frames that form a moving picture. In some embodiments, Video Source 1030 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1025. Game Server 1025 may maintain a copy of the state of the game based on game commands received from multiple players using geographically disperse clients. In these cases, the game state is provided by Game Server 1025 to Video Source 1030, wherein a copy of the game state is stored and rendering is performed. Game Server 1025 may receive game commands directly from Clients 1010 via Network 1015, and/or may receive game commands via Video Server System 1020.

Video Source 1030 typically includes rendering logic, e.g., hardware, firmware, and/or software stored on a computer readable medium such as Storage 1055. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1010. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1030 includes a video recording device such as a camera. This camera may be used to generate delayed or live video that can be included in the video stream of a computer game. The resulting video stream, optionally includes both rendered images and images recorded using a still or video camera. Video Source 1030 may also include storage devices configured to store previously recorded video to be included in a video stream. Video Source 1030 may also include motion or positioning sensing devices configured to detect motion or position of an object, e.g., person, and logic configured to determine a game state or produce video-based on the detected motion and/or position.

Video Source 1030 is optionally configured to provide overlays configured to be placed on other video. For example, these overlays may include a command interface, log in instructions, messages to a game player, images of other game players, video feeds of other game players (e.g., webcam video). In embodiments of Client 1010A including a touch screen interface or a gaze detection interface, the overlay may include a virtual keyboard, joystick, touch pad, and/or the like. In one example of an overlay a player's voice is overlaid on an audio stream. Video Source 1030 optionally further includes one or more audio sources.

In embodiments wherein Video Server System 1020 is configured to maintain the game state based on input from more than one player, each player may have a different point of view comprising a position and direction of view. Video Source 1030 is optionally configured to provide a separate video stream for each player based on their point of view. Further, Video Source 1030 may be configured to provide a different frame size, frame data size, and/or encoding to each of Client 1010. Video Source 1030 is optionally configured to provide 3-D video.

I/O Device 1045 is configured for Video Server System 1020 to send and/or receive information such as video, commands, requests for information, a game state, gaze information, device motion, device location, user motion, client identities, player identities, game commands, security information, audio, and/or the like. I/O Device 1045 typically includes communication hardware such as a network card or modem. I/O Device 1045 is configured to communicate with Game Server 1025, Network 1015, and/or Clients 1010.

Processor 1050 is configured to execute logic, e.g. software, included within the various components of Video Server System 1020 discussed herein. For example, Processor 1050 may be programmed with software instructions in order to perform the functions of Video Source 1030, Game Server 1025, and/or a Client Qualifier 1060. Video Server System 1020 optionally includes more than one instance of Processor 1050. Processor 1050 may also be programmed with software instructions in order to execute commands received by Video Server System 1020, or to coordinate the operation of the various elements of Game System 1000 discussed herein. Processor 1050 may include one or more hardware device. Processor 1050 is an electronic processor.

Storage 1055 includes non-transitory analog and/or digital storage devices. For example, Storage 1055 may include an analog storage device configured to store video frames. Storage 1055 may include a computer readable digital storage, e.g. a hard drive, an optical drive, or solid state storage. Storage 1015 is configured (e.g. by way of an appropriate data structure or file system) to store video frames, artificial frames, a video stream including both video frames and artificial frames, audio frame, an audio stream, and/or the like. Storage 1055 is optionally distributed among a plurality of devices. In some embodiments, Storage 1055 is configured to store the software components of Video Source 1030 discussed elsewhere herein. These components may be stored in a format ready to be provisioned when needed.

Video Server System 1020 optionally further comprises Client Qualifier 1060. Client Qualifier 1060 is configured for remotely determining the capabilities of a client, such as Clients 1010A or 1010B. These capabilities can include both the capabilities of Client 1010A itself as well as the capabilities of one or more communication channels between Client 1010A and Video Server System 1020. For example, Client Qualifier 1060 may be configured to test a communication channel through Network 1015.

Client Qualifier 1060 can determine (e.g., discover) the capabilities of Client 1010A manually or automatically. Manual determination includes communicating with a user of Client 1010A and asking the user to provide capabilities. For example, in some embodiments, Client Qualifier 1060 is configured to display images, text, and/or the like within a browser of Client 1010A. In one embodiment, Client 1010A is an HMD that includes a browser. In another embodiment, client 1010A is a game console having a browser, which may be displayed on the HMD. The displayed objects request that the user enter information such as operating system, processor, video decoder type, type of network connection, display resolution, etc. of Client 1010A. The information entered by the user is communicated back to Client Qualifier 1060.

Automatic determination may occur, for example, by execution of an agent on Client 1010A and/or by sending test video to Client 1010A. The agent may comprise computing instructions, such as java script, embedded in a web page or installed as an add-on. The agent is optionally provided by Client Qualifier 1060. In various embodiments, the agent can find out processing power of Client 1010A, decoding and display capabilities of Client 1010A, lag time reliability and bandwidth of communication channels between Client 1010A and Video Server System 1020, a display type of Client 1010A, firewalls present on Client 1010A, hardware of Client 1010A, software executing on Client 1010A, registry entries within Client 1010A, and/or the like.

Client Qualifier 1060 includes hardware, firmware, and/or software stored on a computer readable medium. Client Qualifier 1060 is optionally disposed on a computing device separate from one or more other elements of Video Server System 1020. For example, in some embodiments, Client Qualifier 1060 is configured to determine the characteristics of communication channels between Clients 1010 and more than one instance of Video Server System 1020. In these embodiments the information discovered by Client Qualifier can be used to determine which instance of Video Server System 1020 is best suited for delivery of streaming video to one of Clients 1010.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The disclosure can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing disclosure has been described in some detail for purposes of clarity of understanding, it will be apparent that certain changes and modifications can be practiced within the scope of the appended claims. Accordingly, the present embodiments are to be considered as illustrative and not restrictive, and the disclosure is not to be limited to the details given herein, but may be modified within the scope and equivalents of the present disclosure.

What is claimed is:

1. A method for rendering virtual reality (VR) views into VR scenes for presentation to a head mounted display (HMD), comprising,
    sensing a position of a nose of a user when the HMD is worn by the user;
    detecting eye gaze of the user using one or more eye gaze sensors disposed in a display housing of the HMD;
    identifying a model of the nose of the user based on the position that is sensed, the model of the nose having a dimension that is based on the position of the nose of the user when the HMD is worn; and
    rendering images to a screen of the HMD to present the VR scenes, the images being augmented to include nose image data from the model of the nose;
    wherein the augmenting is adjusted to include more of the nose image data when it is determined that the eye gaze is directed down and toward the nose of the user.

2. The method of claim 1, wherein the screen of the HMD is defined by a left screen for a left eye of the user and a right screen for a right eye of the user, the nose image data being rendered near a bottom right region of the left screen and a bottom left region of the right screen.

3. The method of claim 1, wherein the dimension of the model of the nose includes an approximate size of the nose of the user, the dimension of the model of the nose is used to define a degree by which the images are augmented to include the image data of the model of the nose.

4. The method of claim 1, wherein the model of the nose has a three-dimensional shape that is approximated from the position of the nose of the user in a nose insert region of a display housing of the HMD.

5. The method of claim 1, wherein the sensing of the position of the nose is processed by detecting a proximity of the nose from a proximity sensor disposed in a nose insert region of a display housing of the HMD.

6. The method of claim 1, further comprising,
    sensing that the HMD is being worn by a user;
    wherein sensing that the HMD is being worn by the user is processed by detecting proximity of a forehead of the user from a proximity sensor disposed in a display housing of the HMD.

7. The method of claim 1, further comprising,
    wherein a display housing of the HMD includes optics for viewing the screen, the optics are configured for placement proximate to eyes of the user, the placement of the optics act to provide a view toward the screen and also act to occlude facial features of the user when wearing the HMD, the method further includes,
    detecting movements of occluded facial features of the user using one or more proximity sensors that are disposed around an inner surface of the display housing that surround the optics.

8. The method of claim 7, further comprising,
    determining an amount of the movements of the occluded facial features; and
    augmenting the images rendered to the screen of the HMD to further include one or more shadows around one or more peripheries of the images.

9. The method of claim 8, wherein a degree of the augmenting of the images to include one or more shadows is based on the amount of the movements detected of the occluded facial features using the one or more proximity sensors that are disposed around the inner surface of the display housing that surround the optics.

10. The method of claim 1, further comprising,
    detecting a position of at least one nose flap of a display housing of the HMD, the at least one nose flap being disposed adjacent to a nose insert region of the display housing, the nose flap configured to move in response to the nose of the user being placed at least partially in the nose insert region.

11. The method of claim 1, wherein the adjusting of the augmentation of the image is to include less of the nose image data when it is determined that the eye gaze is directed away from the nose of the user.

12. A method for rendering virtual reality (VR) views into VR scenes for presentation to a head mounted display (HMD), comprising,
    sensing one or more geometric surfaces of a nose of the user by one or more proximity sensors disposed in or around a nose insert region of a display housing of the HMD;
    generating a model of the nose of the user using the sensed one more geometric surfaces;
    detecting eye gaze of the user using one or more eye gaze sensors disposed in the display housing of the HMD; and
    rendering images to a screen of the HMD to present the VR scenes, the images being augmented to include nose image data from the model of the nose;
    wherein the augmenting of the images is adjusted to include more of the nose image data when it is determined that the eye gaze is directed down and toward the nose of the user.

13. The method of claim 12, wherein the screen of the HMD is defined by a left screen for a left eye of the user and a right screen for a right eye of the user, the nose image data being rendered near a bottom right region of the left screen and a bottom left region of the right screen, the left and right screens being disposed in the display housing having a left optic in front of the left screen and a right optic in front of the right screen.

14. The method of claim 13, wherein the one or more geometric surfaces include,
    at least a surface indicative of a length of the nose of the user relative to one or more of the proximity sensors of the display housing; and
    at least a surface indicative of a position of a nose bridge region of the nose of the user relative to one or more of the proximity sensors of the display housing.

15. The method of claim 14, further comprising,
    using information regarding the surface indicative of the length of the nose and the surface indicative of the position of the nose bridge region to generate the model of the nose of the user, the model of the nose of the user being generated at least in part using data of one or more standard nose shapes accessed from a database of standard nose shapes.

16. The method of claim 15, wherein the information regarding the surface indicative of the length of the nose and the surface indicative of the position of the nose bridge region is used to identify a best fit to the one or more standard nose shapes from the database, and using said information to generate the model of the nose, the model of the nose being semi-custom for the user.

17. The method of claim 14, further comprising,
using information regarding the surface indicative of the length of the nose and the surface indicative of the position of the nose bridge region to generate the model of the nose of the user, the model identifying a three-dimensional shape that includes one or more contours of the nose of the user, the three-dimensional shape configured with color and lighting to approximate a skin color of the user as detected by a camera.

18. The method of claim 12, wherein the one or more proximity sensors include one or more of optical sensors, camera sensors, infrared (IR) sensors, ultrasonic sensors, depth sensors, three-dimensional imaging sensors, point-distance capturing sensors, or combinations of two or more thereof.

19. The method of claim 12, further comprising,
detecting a position of at least one nose flap of the display housing of the HMD, the at least one nose flap being disposed adjacent to a nose insert region of the display housing, the nose flap configured to move in response to the nose of the user being placed at least partially in the nose insert region.

20. The method of claim 19, further comprising,
approximating a width of the nose of the user by processing the detected position of the at least one nose flap of the display housing, the width that is approximated is used in generating the model of the nose.

21. The method of claim 12, wherein the adjusting of the augmentation of the image is to include less of the nose image data when it is determined that the eye gaze is directed away from the nose of the user.

22. A method for processing virtual reality (VR) views for VR scenes for presentation to a head mounted display (HMD), comprising,
detecting a direction of eye gaze of a user via one or more eye gaze sensors disposed in a display housing of the HMD; and
rendering images to a screen of the HMD to present the VR scenes, the images being augmented to include nose image data;
wherein the augmenting of the images is adjusted to include more of the nose image data when the direction of the eye gaze is more toward a nose of the user and adjusted to include less of the nose image data when the direction of the eye gaze is less toward the nose.

* * * * *